United States Patent
Sen et al.

(10) Patent No.: US 10,581,707 B2
(45) Date of Patent: Mar. 3, 2020

(54) METHOD AND APPARATUS FOR SELECTIVE SEGMENT REPLACEMENT IN HAS VIDEO STREAMING ADAPTATION

(71) Applicants: AT&T Intellectual Property I, L.P., Atlanta, GA (US); The Regents of the University of Michigan, Ann Arbor, MI (US)

(72) Inventors: Subhabrata Sen, Westfield, NJ (US); Zhuoqing Morley Mao, Ann Arbor, MI (US); Shichang Xu, Ann Arbor, MI (US)

(73) Assignees: AT&T Intellectual Property I, L.P., Atlanta, GA (US); The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 15/949,735

(22) Filed: Apr. 10, 2018

(65) Prior Publication Data
US 2019/0312797 A1 Oct. 10, 2019

(51) Int. Cl.
*H04L 12/26* (2006.01)
*H04L 29/06* (2006.01)
*H04W 24/08* (2009.01)

(52) U.S. Cl.
CPC .......... *H04L 43/08* (2013.01); *H04L 65/4069* (2013.01); *H04W 24/08* (2013.01)

(58) Field of Classification Search
CPC ....... H04L 65/60; H04L 65/607; H04L 67/02; H04L 67/28; H04L 67/1097; H04L 67/10
See application file for complete search history.

(56) References Cited

U.S. PATENT DOCUMENTS

| | | |
|---|---|---|
| 8,953,452 B2 | 2/2015 | Gahm et al. |
| 9,124,642 B2 | 9/2015 | Choudhury et al. |
| 9,191,284 B2 | 11/2015 | Kordasiewicz et al. |
| 9,215,182 B2 | 12/2015 | Gahm et al. |
| 9,438,653 B2 | 9/2016 | De Vleeschauwer et al. |
| 9,456,387 B2 | 9/2016 | Viswanathan et al. |
| 9,479,739 B2 | 10/2016 | Lindquist et al. |
| 9,485,289 B2 | 11/2016 | Zhu et al. |
| 9,628,532 B2 | 4/2017 | McHugh et al. |

(Continued)

FOREIGN PATENT DOCUMENTS

WO 20160205674 A1 12/2016

*Primary Examiner* — Kim T Nguyen
(74) *Attorney, Agent, or Firm* — Guntin & Gust, PLC; Jay Anderson

(57) ABSTRACT

Aspects of the subject disclosure may include, for example, upon receiving a request for media content, a first signal quality may be determined, a first quality level may be selected based on the first signal quality, and segments of the first quality level may be retrieved, stored in a buffer, and played from the buffer. When the buffer is sufficiently occupied first inferior segments stored in the buffer may be replaced by determining a second signal quality selecting a second quality level based on the second signal quality, identifying the first inferior segment based on the second quality level, and replacing the first inferior segment with a first replacement segment, the first replacement segment corresponding to the first inferior segment. These processes may be performed iteratively. Other embodiments are disclosed.

20 Claims, 15 Drawing Sheets

(56) References Cited

U.S. PATENT DOCUMENTS

| | | |
|---|---|---|
| 9,723,049 B2 | 8/2017 | De Vleeschauwer et al. |
| 9,825,801 B1* | 11/2017 | Bakken ............. H04L 29/06027 |
| 2014/0189064 A1 | 7/2014 | Cilli et al. |
| 2014/0280760 A1* | 9/2014 | Hurst ...................... H04L 65/60 709/219 |
| 2016/0014184 A1 | 1/2016 | Oyman et al. |
| 2017/0085620 A1 | 3/2017 | Wei et al. |
| 2017/0149860 A1* | 5/2017 | Ben Eli ................. H04L 65/607 |
| 2017/0257412 A1 | 9/2017 | Lohmar et al. |

\* cited by examiner

METHOD AND APPARATUS FOR SELECTIVE SEGMENT REPLACEMENT IN HAS VIDEO STREAMING ADAPTATION

FIELD OF THE DISCLOSURE

The subject disclosure relates to a Segment Replacement in Video Streaming Applications.

BACKGROUND

Mobile video streaming has become increasingly popular in recent years. However, delivering good streaming experience over cellular networks is technically challenging due to variable network conditions. HTTP Adaptive Streaming (HAS) has been adopted for streaming video over cellular by most providers. It enables apps to adapt the streaming quality to changing network conditions. However, state of the art HAS players are not without their flaws.

BRIEF DESCRIPTION OF THE DRAWINGS

Reference will now be made to the accompanying drawings, which are not necessarily drawn to scale, and wherein.

DETAILED DESCRIPTION

Figure 1A:
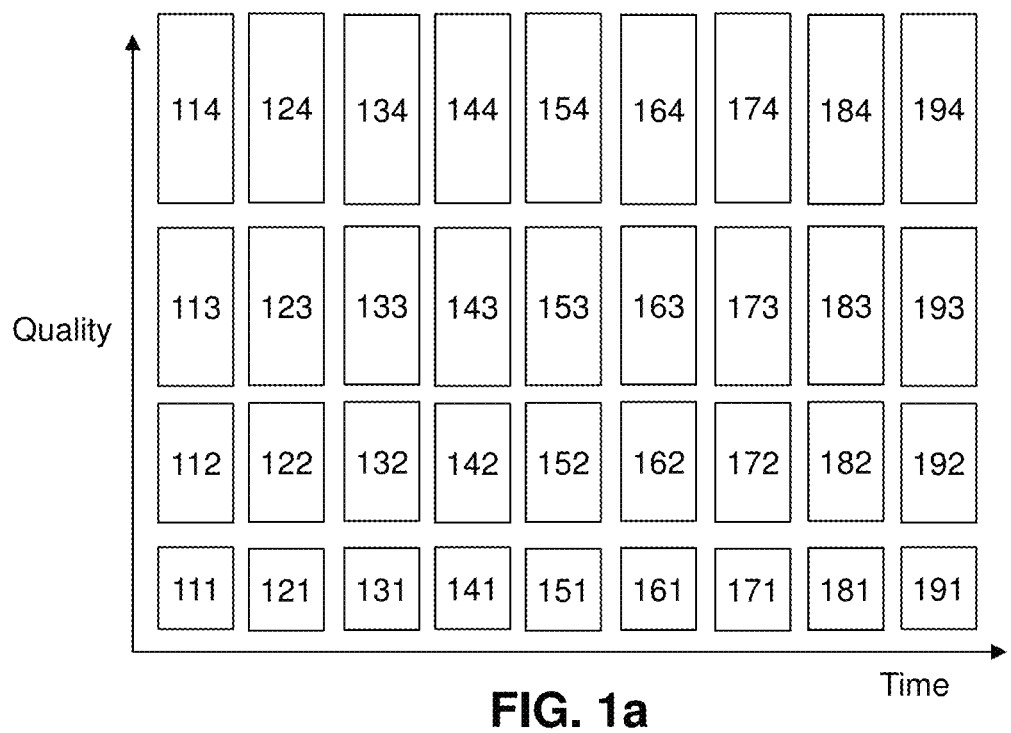
FIGS. 1a-1c depict an illustration of exemplary HTTP Adaptive Streaming (HAS)

The subject disclosure describes, among other things, illustrative embodiments for Segment Replacement in Video Streaming Applications. Other embodiments are described in the subject disclosure.

One or more aspects of the subject disclosure include efficiently replacing segments in video streaming applications.

One or more aspects of the subject disclosure include replacing segments with higher quality segments.

One or more aspects of the subject disclosure include replacing segments with sufficiently higher quality segments.

One or more aspects of the subject disclosure include replacing segments when buffer occupancy satisfies a threshold.

One or more aspects of the subject disclosure include replacing segments below a quality threshold.

One or more aspects of the subject disclosure include replacing segments in video streaming applications one segment at a time, in order to maximize user experience, while minimizing waste.

One or more aspects of the subject disclosure include a method replacing segments in video streaming applications that may begin by receiving a request for media content. The media content may be divided into segments, with each segment being available in a plurality of quality levels. The method may include determining a first signal quality of a wireless network. The method may include selecting a first quality level based on the first signal quality. The method may include retrieving at least some of the segments of the first quality level. The method may include storing the segments in a buffer. The method may include playing the segments from the buffer, while retrieving additional segments, storing the additional segments in the buffer, and deleting segments that have been played from the buffer. When an occupancy of the buffer satisfies a first threshold, the method may include halting retrieving additional segments and beginning replacing inferior segments stored in the buffer with replacement segments of a higher quality level. This may be done one at a time. For example, this replacement process may comprise determining a second signal quality of the wireless network experienced during retrieval of recent segments, selecting a second quality level based on the second signal quality, identifying the first inferior segment based on the second quality level, retrieving the first replacement segment of the second quality level, the first replacement segment corresponding to the first inferior segment, and replacing the first inferior segment with the first replacement segment. The method may also include monitoring the occupancy of the buffer and, when the first threshold changes from being satisfied to not being satisfied, resuming retrieving additional segments.

One or more aspects of the subject disclosure include a device including a processing system including a processor, a user interface, a buffer, and a memory that stores executable instructions that facilitate obtaining a request for media content. The media content may be divided into segments, with each segment being available in a plurality of quality levels. The instructions may also facilitate storing at least some of the segments of a first quality level in the buffer. The instructions may also facilitate presenting the segments from the buffer to a user through the user interface, while storing additional segments in the buffer and deleting segments that have been presented from the buffer. When an occupancy of the buffer satisfies a first threshold, the instructions may facilitate halting retrieving additional segments and beginning replacing a first inferior segment of the segments stored in the buffer with a first replacement segment of a higher quality level. This may be done one at a time. For example, this replacement process may comprise determining a first signal quality of the wireless network experienced during retrieval of recent segment(s), selecting a second quality level of the plurality of quality levels based on the first signal quality, identifying the first inferior segment based on the second quality level, obtaining the first replacement segment of the second quality level, the first replacement segment corresponding to the first inferior segment, and replacing the first inferior segment in the buffer with the first replacement segment. The instructions may also facilitate monitoring the occupancy of the buffer and, when the first threshold changes from being satisfied to not being satisfied, resuming storing additional segments in the buffer.

One or more aspects of the subject disclosure include a non-transitory, machine-readable medium, comprising executable instructions that facilitate receiving a request for media content. The media content may be divided into segments, with each segment being available in a plurality of quality levels. The instructions may also facilitate determining a first signal quality of a wireless network. The instructions may also facilitate selecting a first quality level based on the first signal quality. The instructions may also facilitate obtaining at least some of the segments of the first quality level and storing them in a buffer having a capacity. The instructions may also facilitate segments from the buffer, while retrieving additional segments, storing the additional segments in the buffer, and deleting segments that have been presented from the buffer. When an occupancy of the buffer satisfies a first threshold, the instructions may facilitate halting retrieving additional segments and begin replacing inferior segments stored in the buffer with a replacement segments of a higher quality level. This may be done one at a time. For example, this replacement process may comprise determining signal quality experienced during retrieval of the segments, selecting a quality level based on the signal quality, identifying the first inferior segment based on the second quality level, retrieving the first replacement segment of the second quality level, and replacing the first inferior segment with the first replacement segment. The instructions may also facilitate monitoring the occupancy of the buffer and, when the first threshold changes from being satisfied to not being satisfied, resuming the retrieving the additional segments.

Generally, a user will request media content for playback on their device, through a user interface of the device. The device then connects with a source of that media content and begins downloading segments of the media content to its buffer, playing those segments from the buffer, and deleting the segments from the buffer as they are played, or otherwise presented to the user through the user interface. As will be explained, HTTP Adaptive Streaming (HAS) allows the device to retrieve and store in its buffer segments of different quality, based on a changing signal quality of its network connection. The signal quality can relate to signal strength, a signal to noise ratio, and/or available network bandwidth. As the signal quality can, and often does, change over time, HAS methods have been used to account for such changes, while attempting to maximize the user's quality of experience (QoE), in playback of the media content.

Figure 1B:
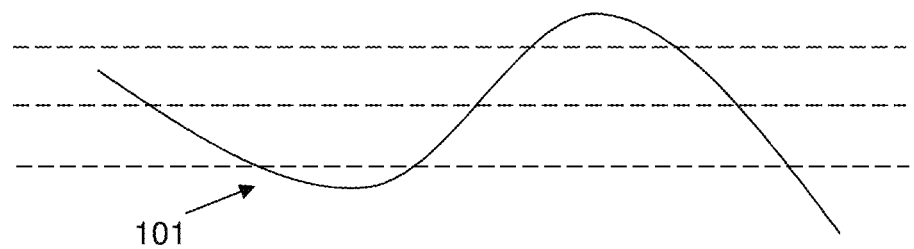
Figure 1C:
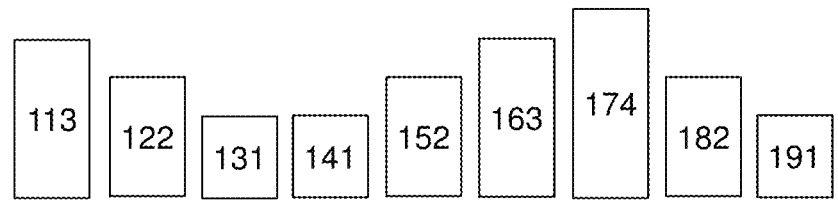

FIGS. 1a-1c depict an illustrative embodiment of a HAS method that may be used to populate a buffer of a device, such as the device 700 described in connection with FIG. 7 and/or the device 800 described in connection with FIG. 8, accounting for variable network conditions. Specifically, as shown in FIG. 1a, media, such as videos, music, or other audio/video media can be stored on a server or other source of media content, encoded in multiple tracks, with each track having a different bit rate or quality level. A higher bit rate generally means that the track is of higher quality. In an effort to account for variable network conditions, each track can be broken down into multiple segments. These segments can be, but need not be, equal time slices of the media.

Expressed in another way, media can be broken down into multiple segments, with each segment being a time-slice of the media, with multiple quality level versions of each segment being stored. This concept may be easier visualized referring specifically to FIG. 1a. As shown in FIG. 1, a piece of media content is broken down in to segments 11#, 12#, 13#, 14#, 15#, 16#, 17#, 18#, and 19#, over a Time scale (left to right). Different quality versions of each segment ##1, ##2, ##3, and ##4 are stored, illustratively depicted here vertically along a Quality scale.

As shown, segments 111, 112, 113, and 114 all represent the same segment, or time slice, of a video or other media. Segment 114 is larger than, and thus represents a greater bit rate or quality level then segments 111, 112, or 113. Likewise, segment 113 is larger than, and thus represents a greater bit rate or quality level than segments 111 or 112. Finally, segment 112 is larger than, and thus represents a greater bit rate or quality level than segment 111. Thus, segment 114 is of the highest bit rate and quality level, while segment 111 is of the lowest bit rate, or quality level.

As represented in FIG. 1a, segments 111, 121, 131, 141, 151, 161, 171, 181, and 191 each represent a different time-slice of the media. They are shown as equal time-slices. But, they may need not be equal. Furthermore, the media may be divided into segments according to some factor other than time, which is being used here as purely illustrative. Together, in this example, segments 111, 121, 131, 141, 151, 161, 171, 181, and 191 may collectively represent the media, in its entirety, albeit at the lowest quality level. Alternatively, these segments may collectively only represent a portion of the media. Similarly, in this example, segments 114, 124, 134, 144, 154, 164, 174, 184, and 194 may collectively represent the media, in its entirety or only a portion thereof, at the highest quality level. One should recognize that 1) the media may be broken down into fewer or more segments than the nine shown segments, and 2) fewer or more quality levels may be used, while four are shown here for simplicity of illustration.

As discussed above, the media is broken down into segments, with each segment being stored in various quality levels because network conditions vary, and therefore a signal quality may change over time due to changing conditions, such as congestion, distance, interference, and/or other factors. FIG. 1b is intended to represent an exemplary changing signal quality 101, due to these network conditions, over time. This changing signal quality 101 can impact available bandwidth and/or error rates, etc., and therefore affect a decision as to which quality level of each segment to retrieve.

Referring also to FIG. 1c, recognizing the exemplary nature, when the depicted media content is first requested, the signal quality 101 is good, not excellent, therefore a device utilizing concepts of HAS may choose to retrieve the third quality level (of four quality levels) for the first segment. While retrieving the first segment, signal quality 101 drops, and therefore the device using HAS may choose to retrieve the second quality level for the second segment. While retrieving the second segment, signal quality 101 drops further, and therefore the device using HAS may choose to retrieve the lowest quality level for the third segment. While retrieving the third segment, signal quality 101 does not appreciably change, and therefore the device using HAS may choose to retrieve the lowest quality level for the fourth segment. While retrieving the fourth segment, signal quality 101 improves, and therefore the device using HAS may choose to retrieve the second quality level for the fifth segment. While retrieving the fifth segment, signal quality 101 improves some more, and therefore the device using HAS may choose to retrieve the third quality level for the sixth segment. While retrieving the sixth segment, signal quality 101 improves yet again, and therefore the device using HAS may choose to retrieve the highest quality level for the seventh segment. While retrieving the seventh segment, the signal quality 101 drops, and therefore the device using HAS may choose to retrieve the second quality level for the eighth segment. While retrieving the eighth segment, signal quality 101 drops further, and therefore the device using HAS may choose to retrieve the first quality level for the ninth segment. In this, or a similar manner, a device utilizing concepts of HAS may populate its buffer with media for playback on the device.

It should be noted that the above example is meant to merely be exemplary. The media may be broken down into more or fewer segments, and more or fewer quality levels. The device may retrieve different quality levels for each successive segment, but need not do so, and may skip over quality levels, such as by going from the fourth quality level to the second, etc. The decision as to which quality level is available, or which quality level to retrieve, is based on the signal quality 101 of the network connection, such as a wireless network.

Finally, while in the above example, the device analyzed the signal quality 101 experienced during retrieval of the immediately preceding segment, before deciding which quality level of the next segment to retrieve, this need not be the case. For example, the device may analyze the signal quality 101 and then retrieve two, three, four, or more segments of a certain quality level before reanalyzing the signal quality 101 and deciding which quality level to retrieve for the next group of segments. In any case, the above rudimentary example of how a device utilizing concepts of HAS may populate its buffer with media for playback on the device may be helpful to understanding the following description of certain aspects of the exemplary embodiments.

When the device's buffer is full, or sufficiently filled, with the requested media, the device may begin presenting the media, such as by playing a video or music, through a user interface of the device. As segments are presented from the buffer, those segments are deleted from the buffer, making room in the buffer for new and/or better quality segments. Of course, the device may also begin presenting the media as the first segment is being downloaded, or retrieved. In either case, the device may present segments from the buffer through the user interface while deleting presented segments from the buffer and retrieving additional segments.

Figure 2A:
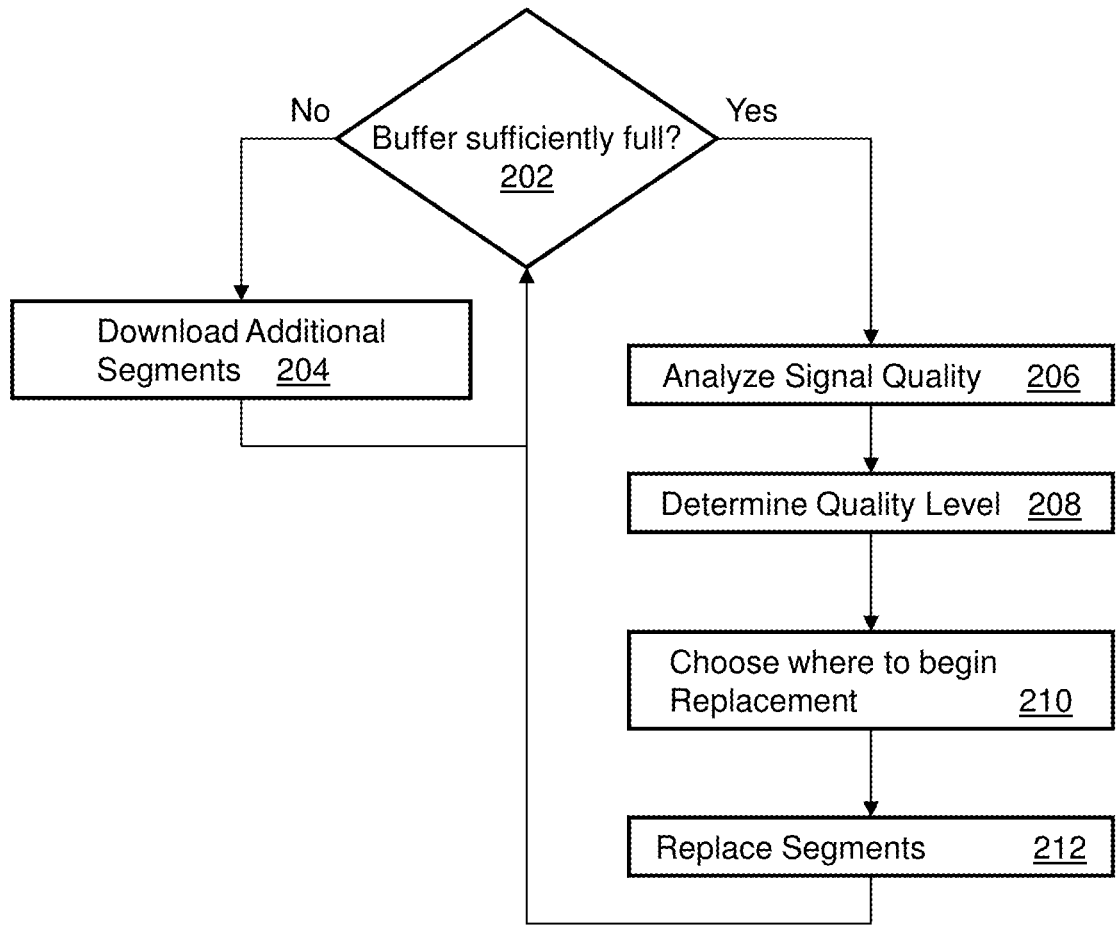
FIGS. 2a and 2b depict an illustrative embodiment of a method for replacing segments and exemplary results thereof.
Figure 2B:
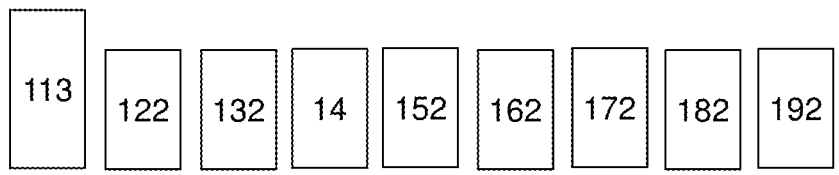

FIGS. 2a and 2b depict an illustrative embodiment of a method and results of replacing segments in the buffer. For example, the device, such as the device 700 described in connection with FIG. 7 and/or the device 800 described in connection with FIG. 8, may decide whether its buffer is full, or sufficiently full, such as with the segments depicted in FIG. 1c, as shown in step 202. If not, the device may choose to download, or otherwise retrieve more segments and store them in the buffer, as depicted in step 204.

If the device's buffer is full, or sufficiently full, the device 700/800 may then decide to halt retrieval of additional segments and utilize the now dormant available bandwidth of its network connection to replace segments in its buffer of poor quality, while presenting segments from the buffer and then deleting the presented segments from the buffer. For example, the device may analyze the signal quality 101, as shown in step 206. Based on the then current signal quality 101, the device may decide which quality level of the segments it can download or retrieve, as depicted in step 208.

For example, the device may analyze the signal quality 101 and determine that it can safely download segments having the second signal quality. The device then chooses which segment(s) to replace, as shown in step 210. For example, referring also to the example of FIG. 1c, because it may only retrieve segments having the second quality level, the device may choose to begin replacing segments at segment 131, retaining segment 122 for presentation while replacing the other segments because segment 122 is already in the buffer at the second quality level. In such a manner, the device may decide where to begin replacing segments, as shown in step 210. Finally, the device may choose to replace all remaining segments with segments of the second quality level, as shown in step 212. The resulting buffer may then resemble that shown in FIG. 2b.

Comparing FIG. 1c with FIG. 2b, one can appreciate that the third, fourth, and ninth segments now stored in the buffer are of better quality than those previously stored in the buffer. Thus, in replacing the third, fourth, and ninth segments, the user's quality of experience (QoE) is expected to increase. This is one of the primary drivers behind replacing segments already retrieved.

Again, comparing FIG. 1c with FIG. 2b, Segments five and eight are unchanged. Thus, in replacing segments five and eight, the device wasted bandwidth that may have been used for other purposes and may have incurred unnecessary data charges. Finally, one can appreciate that the sixth and seventh segments now stored in the buffer are of now of poorer quality than those previously stored in the buffer. So, with respect to at least the sixth and seventh segments, the user's QoE has actually decreased, and the bandwidth initially used, as well as the data charges initially incurred, in initially downloading the sixth and seventh segments has been wasted. In order to avoid such waste, and improve the user's QoE, certain embodiments make individual segment by segment determinations, based on the ever changing signal quality 101, at the time each segment is considered and/or replaced.

Figure 3A:
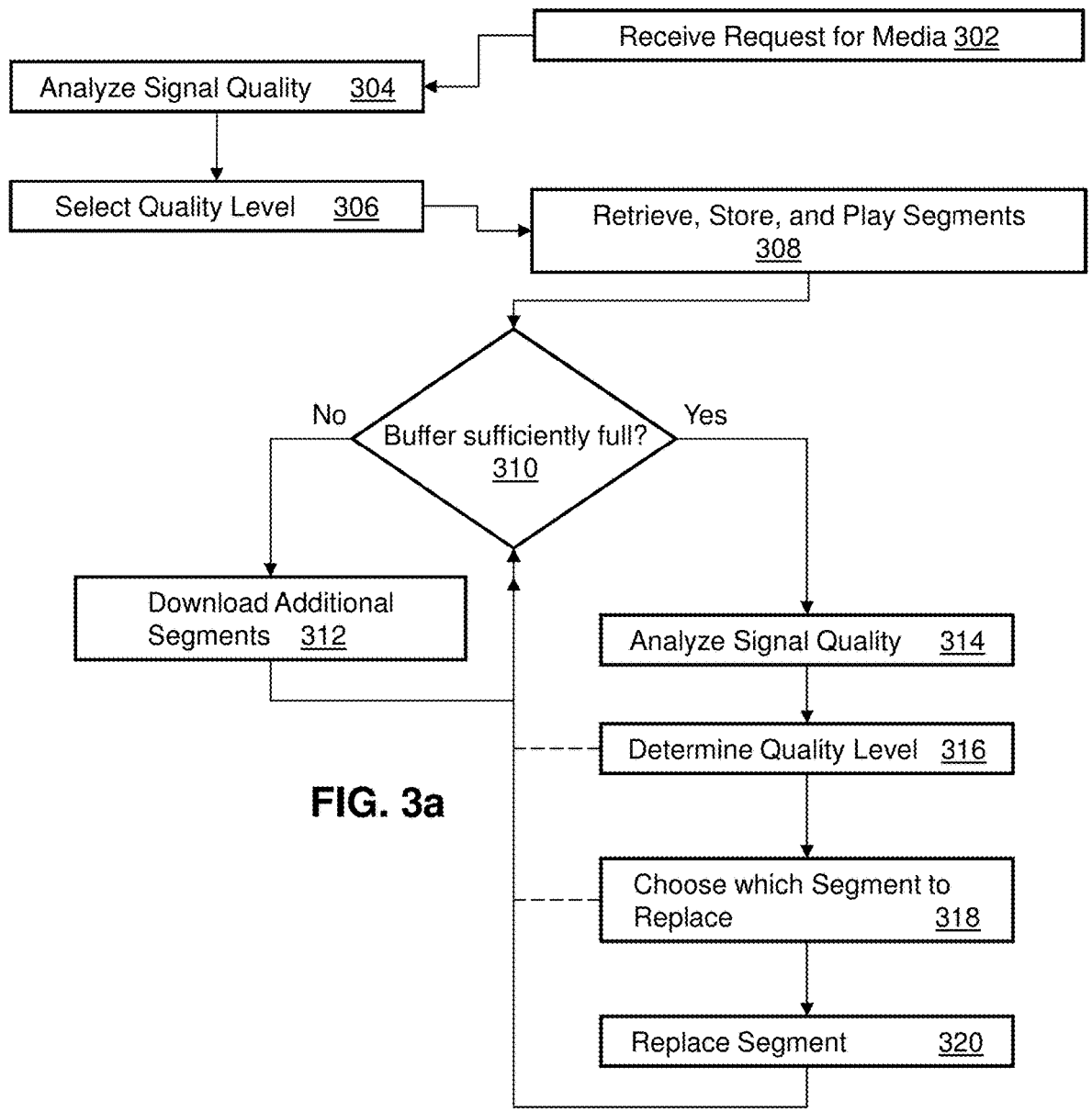
FIGS. 3a and 3b depict another illustrative embodiment of a method for replacing segments and exemplary results thereof.
Figure 3B:
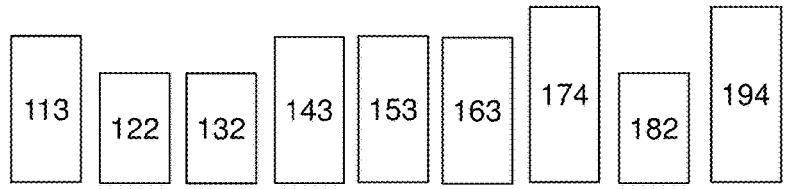

FIG. 3a depicts an illustrative embodiment of a method of selective segment replacement and FIG. 3b shows an exemplary resulting buffer. Initially, a request for media content is received, as shown in step 302. This can constitute the user requesting the media content from his device, such as the device 700 described in connection with FIG. 7 and/or the device 800 described in connection with FIG. 8, for presentation on that device, but may be accomplished in other ways. For example, the user, or another person, may request media content from a first device, for presentation on a second device. In this case, the second device may send a request to the first device or a source of the media content.

In any case, the device then establishes a connection with a source of that media content and begins downloading segments of the media content to its buffer, playing those segments from the buffer, and deleting the segments from the buffer that have been played, or otherwise presented to the user through the user interface. More specifically, one of the devices or the source determines, or otherwise analyzes, the signal quality 101 of a wireless network or other connection, as depicted in step 304. Based on the signal quality 101, the quality level of the segments to be retrieved is determined or selected, as shown in step 306. Then, the device begins retrieving segments of the media content, of the selected quality level, storing them in its buffer, playing those segments from the buffer, deleting the segments from the buffer that have been played, and retrieving additional segments, as shown in step 308.

The device may choose to download one, two, three, four, or more segments before re-analyzing the signal quality 101; re-determining the quality level of the segments to be retrieved, based on the signal quality 101 it is then experiencing; and retrieving additional segments of the selected quality level. For example, the device may analyzing the signal quality 101 and determining the quality level of the segments to be retrieved for each segment. In another embodiment, the device may analyze the signal quality 101 and determine the quality level of the segments to be retrieved for sets, or groups, of segments. These sets, or groups, may comprise two, three, four, or more segments, and may be predetermined in number, or may vary in number, such as with the signal quality 101.

The device continuously, iteratively, regularly, or periodically monitors the buffer and its capacity, as depicted in step 310. In doing so, the device may decide whether its buffer is full, or sufficiently full. For example, it can be appreciated that the buffer has a capacity, or amount of data that it can hold. In some cases, the buffer's capacity may be less than necessary for holding the entirety of the requested media content. In other cases, the buffer's capacity may be more than necessary for holding the entirety of the requested media content.

In at least one embodiment, the capacity, remaining capacity, or occupancy of the buffer is compared to a threshold. That threshold may be directly, or indirectly, related to the actual capacity of the buffer and/or length, or size, the media content. For example, if versions of all remaining segments of the media content have been stored in the buffer, the threshold may be considered to have been satisfied, regardless of any free space in the buffer. Alternatively, the threshold may be set at some percentage of the buffer capacity, such as 60%, 70%, 80%, or 90%. When the buffer is full to 60%, 70%, 80%, or 90%, the threshold may be considered to have been satisfied, regardless of the number or size of the remaining segments of the media content in the buffer, or yet to be retrieved. The threshold may be directly, or indirectly, related to playback time, such that the threshold specifies a minimum amount of content for play back stored in the buffer. For example, the threshold may be satisfied with the buffer contains 10, 20, or 30 second worth of content.

Hybrid approaches are also possible, such as setting the threshold to 60% or 10 seconds when a first portion of the media content has been retrieved, 70% or 20 seconds when a second portion of the media content has been retrieved, 80% or 30 seconds when a third portion of the media content has been retrieved, and 90% when versions of all remaining segments of the media content have been stored in the buffer. It may also go the other way, such as setting the threshold to 90% or 10 seconds when a first portion of the media content has been retrieved, 80% 20 seconds when a second portion of the media content has been retrieved, 70% or 30 seconds when a third portion of the media content has been retrieved, and 60% when versions of all remaining segments of the media content have been stored in the buffer. In any case, when the remaining capacity, or occupancy, of the buffer reaches the threshold, the buffer may be considered full, or sufficiently full, for purposes of replacing inferior segments in the buffer.

It can also be appreciated that remaining capacity, or simply capacity, is inversely related to buffer occupancy, or how full the buffer is. For example, if the buffer is at 60% capacity, its occupancy may be said to be 60%, with 40% remaining capacity. In any case, the device monitors its buffer and decides based on the capacity/occupancy of the buffer, a threshold, and/or a number, size, or percentage of segments of the media content remaining to be retrieved, whether to halt retrieving additional segments and begin replacing segments.

It should be apparent the term "full" does not necessarily require the buffer to be completely full. This is because certain embodiments seek to replace inferior, or poorer quality, segments with better, higher quality segments, which naturally require more space in the buffer. In some cases, the question is whether there are enough segments in the buffer that the device can safely stop retrieving additional segments and begin replacing inferior, or poorer quality, segments with better, higher quality replacement segments. If not, the device may choose to download, or otherwise retrieve additional segments and store them in the buffer, as it continues to play segments from the buffer and delete segments than have been played from the buffer, as depicted in step 312.

If the device's buffer is full, or sufficiently full, it may then decide to halt retrieving additional segments and utilize the now otherwise dormant available bandwidth of its network connection to replace inferior segments in the buffer of poor quality, while continuing to present segments from the buffer and deleting the presented segments from the buffer. For example, the device may again analyze or determine the signal quality 101, as shown in step 314. Based on the then current signal quality 101, the device may decide, or select, which quality level of the segments it can download or retrieve, as depicted in step 316.

For example, the device may analyze the signal quality 101 and determine that it can safely download segments having the second quality level. The device then chooses which segment(s) to replace, as shown in step 318. For example, referring also to the example of FIG. 1c, because it may only retrieve segments having the second quality level, the device may choose to skip segment 122. It should be noted that segment 122 (already stored in the buffer of FIG. 1c) is of quality level two, and therefore replacing it would waste time, bandwidth and possible data charges. Thus, the device decides to skip segment 122. But, because segment 131 stored in the buffer is of a lesser or inferior quality level when compared with the second quality level that the device can retrieve now based on the current, or most recent signal quality 101, the device identifies segment 131 as an inferior segment to be replaced, as shown in step 318. Finally, the device retrieves replacement segment 132 and replaces inferior segment 131 with replacement segment 132, as shown in step 320. This is also depicted in FIG. 3b, when compared with FIG. 1c.

It should be apparent that replacement segment 132 corresponds to inferior segment 131, i.e. they both represent the same portion of the media content (in this case the third), but at differing quality levels. It should also be apparent that replacing inferior segment 131 with replacement segment 132 may constitute deleting inferior segment 131 from the buffer and storing replacement segment 132 in the buffer. Replacement segment 132 may be stored sequentially, between segments 12# and 14#

At this point, the device may check, or otherwise monitor, its buffer again, as depicted in step 310, and decide whether to resume retrieving additional segments or continue replacing inferior segments. If the buffer occupancy/capacity no longer satisfies the threshold, the device may stop replacing inferior segments and resume retrieving additional segments, such as is shown in step 312.

Presuming that the buffer occupancy/capacity still satisfies the threshold, after having replaced inferior segment 131 with replacement segment 132, as shown in step 320, the device may again analyze or determine the signal quality 101, as shown in step 314. Based on the then current signal quality 101, the device may decide or select which quality level of the segments it can download or retrieve, as depicted in step 316.

For example, the device may analyze the signal quality 101 and determine that it can safely download segments having the third quality level. Referring also to the example of FIG. 1c, because it may now retrieve segments having the third quality level, the device may identify segment 141 as the next inferior segment, as shown in step 318. Finally, the device retrieves replacement segment 143 and replaces inferior segment 141 with replacement segment 143, as shown in step 320. This is also depicted in FIG. 3b, when compared with FIG. 1c.

Depending on certain factors, such as what segment is currently playing, how much content is stored in the buffer, and how long it is expected to take to replace a segment, the device may go back and identify segment 132 as the next inferior segment. In this case, the device retrieves replacement segment 133 and replaces inferior segment 132 with replacement segment 133.

The device may then check, or otherwise monitor, its buffer, as depicted in step 310, again. Presuming that the buffer occupancy/capacity still satisfies the threshold, after having replaced inferior segment 141 with replacement segment 143, as shown in step 320, the device may again analyze or determine the signal quality 101, as shown in step 314. Based on the then current signal quality 101, the device may decide or select which quality level of the segments it can download or retrieve, as depicted in step 316.

For example, the device may analyze the signal quality 101 and determine that it can still safely download segments having the third quality level. Referring also to the example of FIG. 1c, because it may now retrieve segments having the third quality level, the device may identify segment 152 as the next inferior segment, as shown in step 318. Finally, the device retrieves replacement segment 153 and replaces inferior segment 152 with replacement segment 153, as shown in step 320. This is also depicted in FIG. 3b, when compared with FIG. 1c.

Presuming that the buffer occupancy/capacity still satisfies the threshold, after having replaced inferior segment 152 with replacement segment 153, as shown in step 320, the device may again analyze or determine the signal quality 101, as shown in step 314. Based on the then current signal quality 101, the device may decide or select which quality level of the segments it can download or retrieve, as depicted in step 316.

For example, the device may analyze the signal quality 101 and determine that it can now only safely download segments having the second quality level. Referring also to the example of FIG. 1c, because it may now retrieve segments having the second signal quality, the device may choose not to replace segments 163, 174, or 182. Thus, the device refrains from replacing segments of a superior or similar quality level with inferior segments, which may otherwise happen as described in connection to the example of FIGS. 2a and 2b. This efficiency is gained from individually analyzing each segment, only replacing inferior segments with higher quality replacement segments, and replacing them one segment at a time, rather than replacing segments in sets or groups.

Having chosen not to replace segments 163, 174, or 182, the device may then loop back to step 310, and check its buffer again. It should be noted that the device may look for inferior segments that could be improved to the second quality level, in this example, or use another threshold to decide what to do. For example, where the signal quality 101 is such that it can only safely download segments having the lowest quality level, the device need not even look for inferior segments, as none can be inferior when compared to any replacement segment of the lowest quality level. Additionally, or alternatively, the device may use a threshold to determine never to replace segments unless the available quality level is above the threshold.

In this case, with the available quality level determined to be the second quality level based on the signal quality 101, the device may not even look for inferior segments in the buffer. Thus, the device may not see that segment 191, shown in FIG. 1c, is inferior when compared to the second quality level. Thus, the device may loop back to step 310, as step 316 or step 318, with or without having tried to identify an inferior segment.

Additionally, or alternatively, the device may have a minimum improvement threshold, such that it does not replace inferior segments unless it can do so to a threshold degree, such a two or three increases in quality level. Thus, the device may consider replacing segment 191, which is stored in the buffer at the lowest quality level, with a corresponding segment of the second quality level, which can now be retrieved, based on the signal quality 101, in this example. However, should this threshold require that any replacement segment constitutes an improvement of at least two quality levels over a corresponding inferior segment, this threshold may prevent the device from replacing inferior segment 191 with potentially available replacement segment 192.

Thus, in the given example, the device loops back to step 310 and checks the buffer again. Presuming that the buffer occupancy/capacity still satisfies the threshold, the device again analyzes the signal quality 101. Presuming that it can now safely download segments having the highest quality level, based on the signal quality 101, the device may identify segment 191, shown in FIG. 1c, and replace it with corresponding segment 194. This can be seen comparing FIG. 3b with FIG. 1c.

The device may utilize additional and/or different thresholds, or utilize these thresholds differently. For example, the inventors have found that QoE is not linearly proportional to the video bitrate, or quality level, of the segments. The relationship is more complex and non-linear. Increasing the bitrate/quality when the bitrate/quality is very low may cause a sharp increase in QoE. But, when the bitrate/quality is already high, further increasing the bitrate/quality may not lead to as much significant QoE improvement. In other words, it may be more important to focus on lower quality level segments. In addition, since lower quality segments are smaller, discarding segments with lower bitrate/quality also has an advantage as it wastes less data/bandwidth.

Thus, when the buffer occupancy is sufficiently high, the device may still choose to forego replacing inferior segments (when compared to the available quality level based on the signal quality 101) that are above a certain threshold. For example, the device may choose to forego replacing segments of the third level of quality, even where the corresponding fourth (or highest) quality level segment can be retrieved. Said another way, the device may be configured to only replace segments below a threshold quality level, regardless of which quality level can be retrieved. In the case of video media, this threshold may be set to only replace segments with resolutions at or below 720 or even 480. This allows certain embodiments to focus on the worst of the inferior segments stored in the buffer.

The thresholds described herein can be fixed, can vary with other factors, and/or can be configurable. For example, an occupancy threshold described above, which may used to determine whether to retrieve additional segments or replace inferior segments in the buffer, may be set at a certain occupancy level, and/or may vary based on the buffer capacity, remaining buffer capacity, buffer occupancy, the number or size of segments remaining to be retrieved, signal quality, and/or other factors. This occupancy threshold may be fixed in relationship to these factors. Alternatively, the occupancy threshold may be user configurable, through the user interface.

Similarly, a quality threshold described above, which may be used to identify inferior segments (having lower quality levels) for replacement, may be set at a certain quality level, and/or may vary based on the buffer capacity, remaining buffer capacity, buffer occupancy, the number or size of segments remaining to be retrieved, signal quality, and/or other factors. This quality threshold may be fixed in relationship to these factors. Alternatively, the quality threshold may be user configurable, through the user interface.

Additionally, an improvement threshold described above, which may be used to identify inferior segments (having sufficiently lower quality levels, when compared with the available quality level based on signal quality) for replacement, may be set at a certain improvement level, and/or may vary based on the buffer capacity, remaining buffer capacity, buffer occupancy, the number or size of segments remaining to be retrieved, signal quality, and/or other factors. This improvement threshold may be fixed in relationship to these factors. Alternatively, the improvement threshold may be user configurable, through the user interface.

While for purposes of simplicity of explanation, the respective processes are shown and described as a series of blocks in FIGS. 2a and 3a, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

For example, while the above methods have been described as sequentially considering each segment stored in the buffer only once, the same segment may be considered multiple times. It should be apparent that while additional segments are retrieved, or inferior segments are replaced, the device continues presenting the media from the buffer. Each time the device considers replacing inferior segments, it may do so beginning with the segment next in line (or further down the line) to be played. In this manner, if the segments are sufficiently long, the device may consider replacing inferior segments one, two, three, or more times before beginning to play the next segment. Thus, any particular segment may be considered for replacement multiple times.

Figure 4:
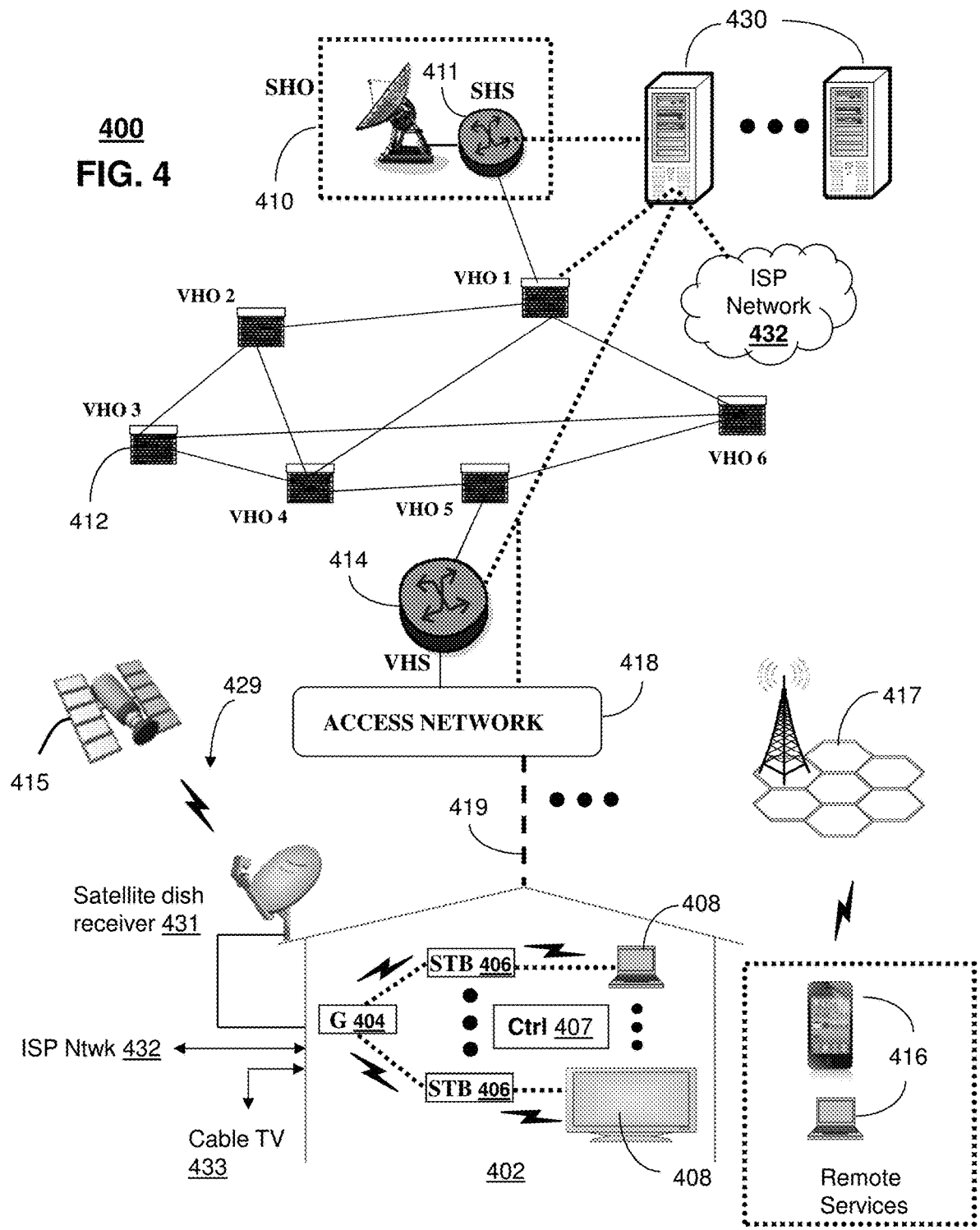
FIGS. 4-5 depict illustrative embodiments of communication systems that provide media services described in connection with FIGS. 1a, 1b, 1c, 2a, 2b, 3a, and 3b.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with the device and/or media content source described above as another representative embodiment of communication system 400. For instance, one or more devices illustrated in the communication system 400 of FIG. 4 may be used at the device and/or media source described above.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
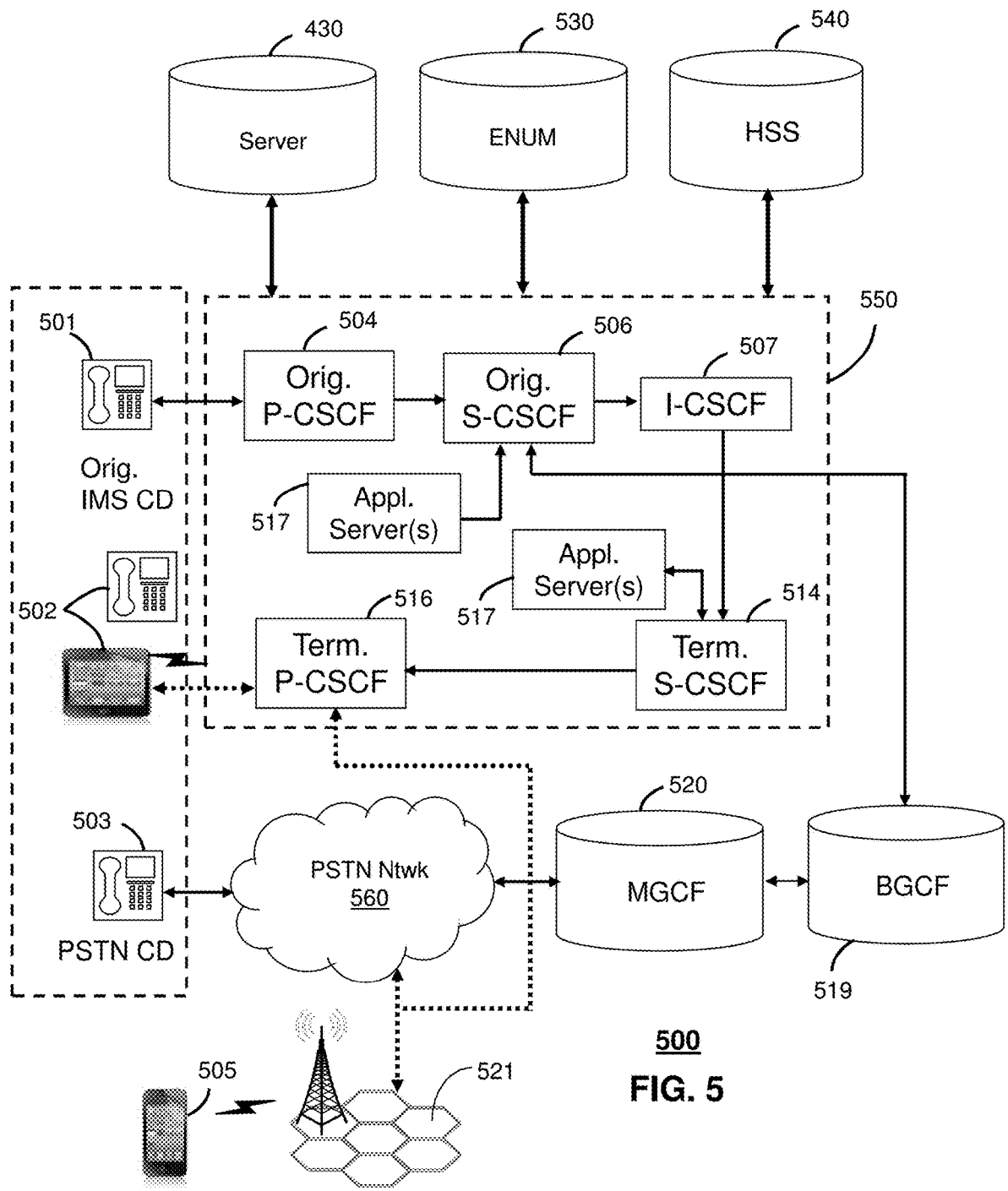

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with the device and/or media content source described above and communication system 400 as another representative embodiment of communication system 400.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 6:
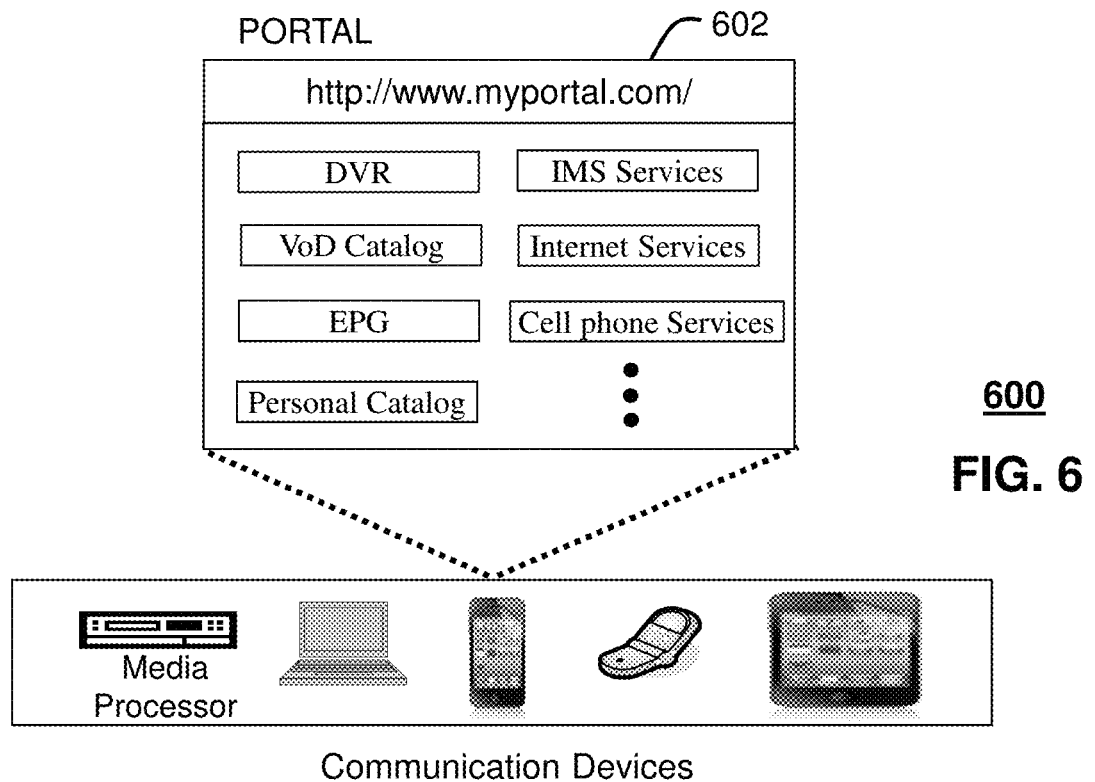
FIG. 6 depicts an illustrative embodiment of a web portal for interacting with the communication systems described in connection with FIGS. 1a, 1b, 1c, 2a, 2b, 3a, 3b, and 4-5.

FIG. 6 depicts an illustrative embodiment of a web portal 602 of a communication system 600. Communication system 600 can be overlaid or operably coupled with the device and/or media content source described, communication system 400, and/or communication system 500 as another representative embodiment of the device and/or media content source described above, communication system 400, and/or communication system 500. The web portal 602 can be used for managing services of the device and/or media content source described above and communication systems 400-500. A web page of the web portal 602 can be accessed by a Uniform Resource Locator (URL) with an Internet browser using an Internet-capable communication device such as those described above in connection with FIGS. 1c, 2a, 2b, 3a, and/or 3b above and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications of the device and/or media content source described above to adapt these applications as may be desired by subscribers and/or service providers. For instance, users can log into their on-line accounts and configure the thresholds on their device, or their subscriptions to the media content sources, and so on. Service providers can log onto an administrator account to provision, monitor and/or maintain the user's device and/or the media content sources.

Figure 7:
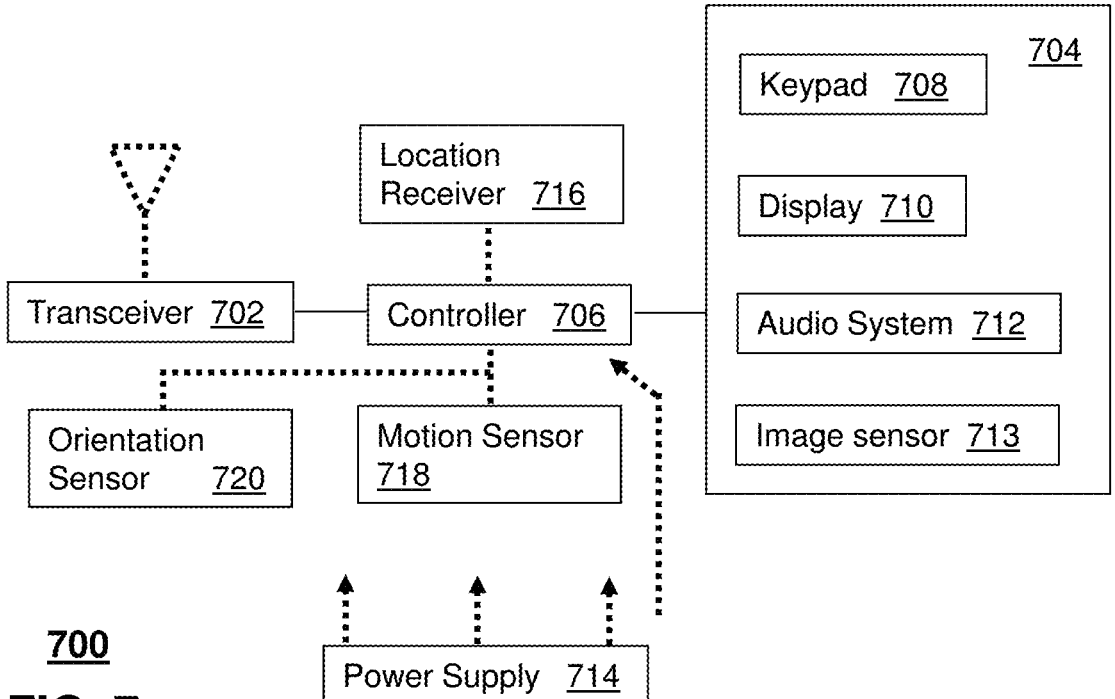
FIG. 7 depicts an illustrative embodiment of a communication device.

FIG. 7 depicts an illustrative embodiment of a communication device 700. Communication device 700 can serve in whole or in part as an illustrative embodiment of the devices described in connection with FIGS. 1c, 2a, 2a, 3a and/or 3b, and FIGS. 4-5 and can be configured to perform the method described in connection with FIGS. 1c, 2a, 2a, 3a and/or 3b, or portions thereof.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions described in connection with FIGS. 1c, 2a, 2b, 3a, and/or 3b, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in the communication systems of FIGS. 4-6 such as a gaming console and a media player.

Upon reviewing the aforementioned embodiments, it would be evident to an artisan with ordinary skill in the art that said embodiments can be modified, reduced, or enhanced without departing from the scope of the claims described below. For example, while certain embodiments have been described as replacing individual segments, one at a time, another embodiment may choose to replace segments in small sets, or groups, such as two or three at a time. Such grouping may be performed by analyzing one or more of the segments and then replacing one or more segments before reanalyzing the signal quality, for example. Such embodiments may still minimize waste, while still improving QoE. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
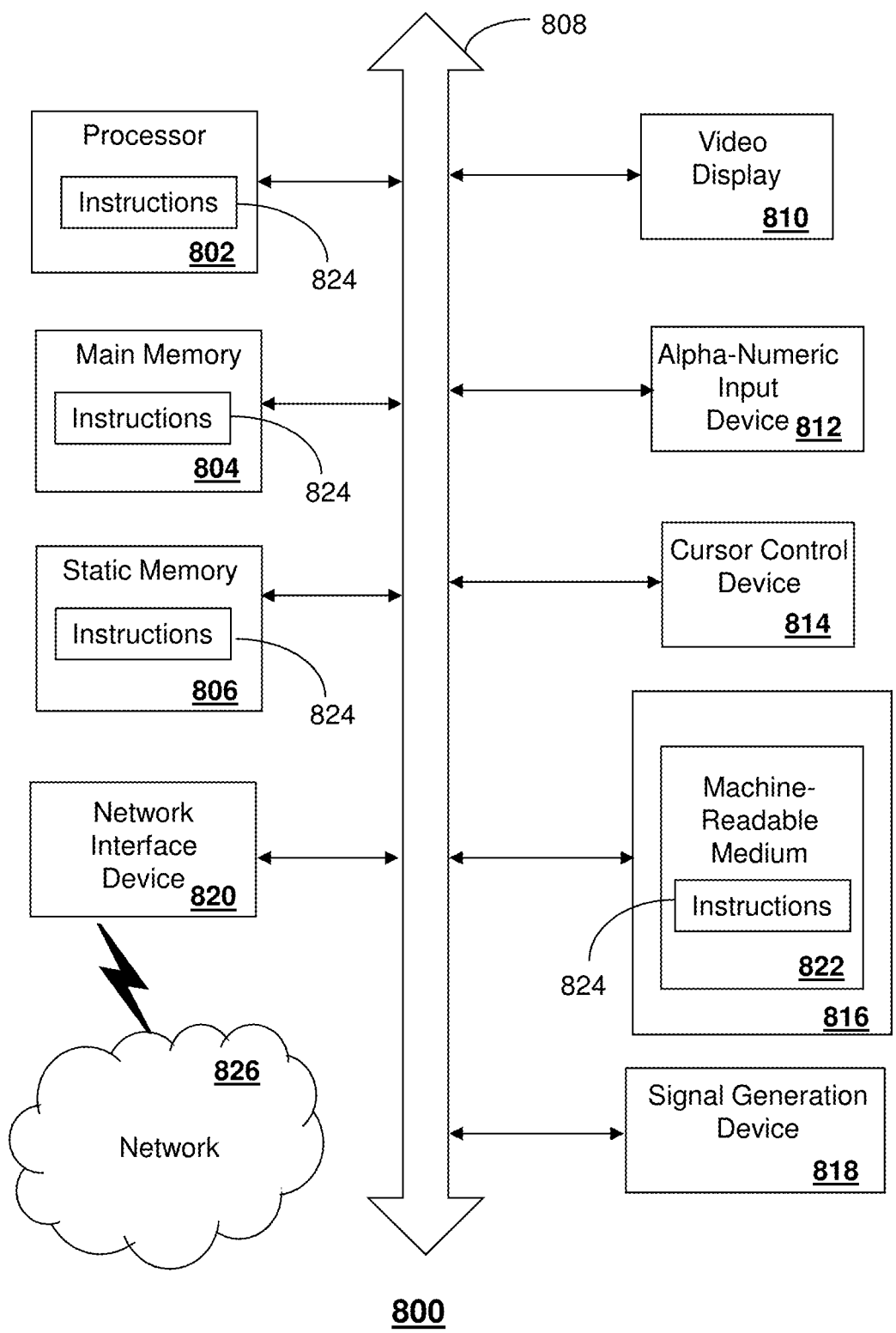
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a device or machine in the form of a computer system 800 within which a set of instructions, when executed, may cause the machine to perform any one or more of the methods described above. For example, the device 800 may be a cellular phone, tablet, or other mobile device carried by the user and used to retrieve and play media content. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The main memory 804 and/or static memory 806 may constitute the buffer described above. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. The display 810, input device 812, and/or signal generation device 818 may implement all or part of the user interface described above. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Study Methodology

Video streaming over the best-effort Internet is challenging, due to variability in available network bandwidth. To address such problems and provide satisfactory QoE, HTTP Adaptive Streaming (HAS) may adapt the video bitrate based on network conditions.

In HAS, videos may be encoded into multiple tracks. Each track may describe the same media content, but with a different quality level. The tracks may be broken down into multiple shorter segments and the client can switch between tracks on a per-segment basis. Media meta-information including the available tracks, segment durations and URIs may be described in a metafile called manifest or playlist.

The manifest may specify a bitrate for each track (referred to as declared bitrate) as an estimation of the network bandwidth required to stream the track. Note that this value can be different from the actual bandwidth needed for downloading individual segments especially in the case of Variable Bitrate (VBR) encoding. How to set this declared bitrate is left to the specific service, and a common practice is to use a value in the neighborhood of the peak bitrate of the track. In addition to the declared bitrate, some HAS implementations also provide more fine-grained information about segment sizes, such as average actual segment bitrate. For services with VBR encoding, as the actual bitrate of segments in the same track can have significant differences, such fine-grained bitrate information can potentially help players better estimate the required network bandwidth to download each track and make more informed decision on track selection.

At the beginning of a session, the player may download the manifest from the server, and may use the HTTP/HTTPS protocol to fetch media segments from the server. Each segment may need to be downloaded completely before being played. To absorb network variance and minimize stall events, the player may maintain a buffer and may try to fetch segments ahead of playback time. During streaming, the client-side adaptation logic (often proprietary) may determine what track to fetch next based on a variety of factors, such as the estimated available network bandwidth and playback buffer occupancy.

There exist a number of different implementations of the above high-level HAS design, involving different file format and protocols, such as HTTP Live Streaming (HLS), Dynamic Adaptive Streaming over HTTP (DASH) and SmoothStreaming.

Figure 9:
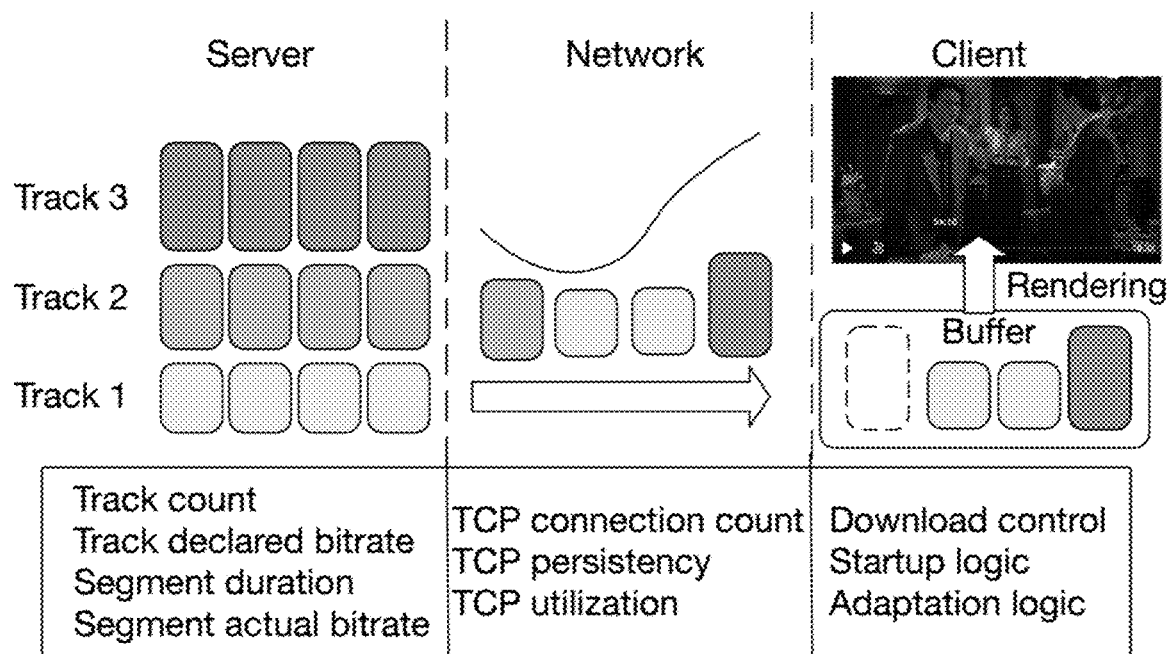
FIG. 9 depicts certain HAS design factors.

Regardless of implementation details, a wide range of factors spanning the server, the network and the client and across the transport and application layers can be customized based on the system designers' considerations around different tradeoffs to optimize streaming performance. For instance, the client can adopt different track selection algorithms to balance video quality and stalls. We summarize some relevant factors in FIG. 9.

We explore a wide range of popular mobile VOD services, including Amazon Video, DIRECTV, FOX NOW, Hulu, HBO GO, HBO NOW, MAX GO, Netflix, NBC Sports, Showtime Anytime and XFINITY TV. These services individually have millions of app store downloads, and collectively span a wide range of content types including movies, TV shows and sports videos.

Understanding the design choices and characterizing the QoE of these proprietary video streaming services are challenging, as they do not readily expose such information. To address the challenge, we develop a general methodology to extract information from the traffic and app UI events. To capture important properties of the adaptation logic designs, we further enhance our methodology with carefully crafted black-box testing to stress test the players.

Figure 10:
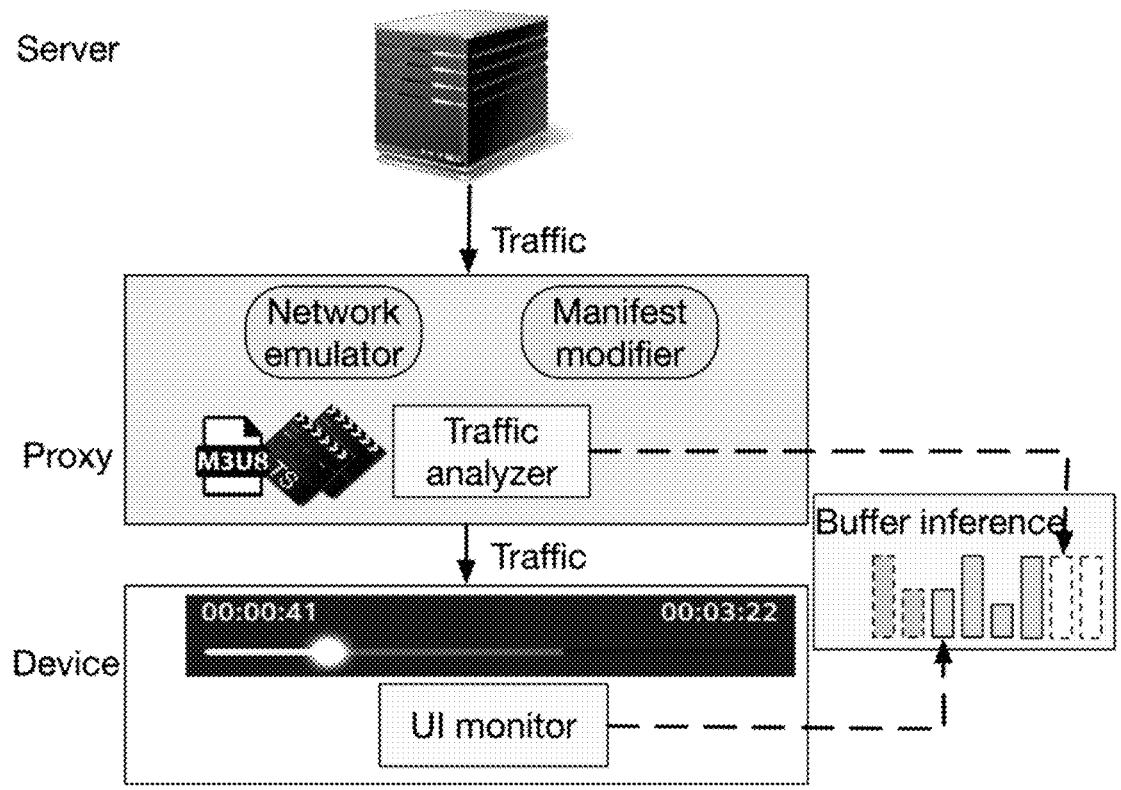
FIG. 10 depicts a study methodology used to study several different HAS implementations.

FIG. 10 shows an overview of the methodology. The proxy between the server and the user device emulates various network conditions and extracts video segment information from the traffic flow. The on-device UI monitor monitors critical UI components, such as the seekbar in the VOD apps that advances with the playback to inform users the playback progress and allow users to move to a new position in the video.

We combine information from the traffic analyzer and UI monitor to characterize QoE. While developing objective measures of overall user QoE for video streaming is still an active research area, it is commonly acknowledged that QoE is highly correlated to a few metrics listed below.

Video Quality.

One commonly used metric to characterize video quality is average video bitrate, i.e. the average declared bitrate of segments shown on the screen. A low video bitrate indicates poor video quality, leading to poor user experience. However, the average bitrate by itself is not sufficient to accurately reflect user experience. User experience is more impacted by the playback of low quality, low bitrate tracks. It is therefore desirable to reduce the duration of streaming such tracks. To account for this, another metric is the percentage of playtime when low quality tracks are streamed.

Video Track Switches.

Frequent track switches can impair user experience. One metric to characterize this is the frequency of switches. In addition, users are more sensitive to switches between non-consecutive tracks.

Stall Duration.

This is the total duration of stall events during a session. A longer stall duration means higher interruptions for users and leads to poorer user experience.

Startup Delay.

The startup delay measures the duration from the time when the users click the "play" button to the time when the first frame of video is rendered on the screen and the video starts to play. A low startup delay is preferred.

Each metric by itself provides only a limited viewpoint and all of them need to be considered together to characterize overall QoE. In our methodology, the Traffic Analyzer obtains detailed segment information, such as bitrate and duration etc., and therefore can be used to characterize video quality and track switches. The UI Monitor on the device tracks the playback progress from the player's UI, and is able to characterize the stall duration and initial delay. Furthermore, combining the information from both the traffic analyzer and the UI monitor, we can infer the player buffer occupancy across time, which critically allows us to reason about, identify and unveil underlying causes of many QoE issues.

To understand complex designs such as the adaptation logic, the proxy uses the Network Emulator and Manifest Modifier to conduct black-box testing. The network emulator performs traffic shaping to emulate various network conditions. By carefully designing the bandwidth profile, we are able to force players to react and understand their design. In some cases, we use the manifest modifier to modify the manifest from the server and observe players' behavior to understand how client side players utilize information from servers. For example, we are able to explore whether players take actual track bitrate information into consideration when performing track selection.

Traffic Analyzer

We developed the network traffic analyzer to perform man-in-the-middle analysis on the proxy and extract manifest and segment information from flows between the server and client.

We observed that all the studied apps adopted one or more among the three popular HAS techniques, i.e. HLS, DASH, and SmoothStreaming We denote the four services that use DASH as D1 to D4, another six that use HLS as H1 to H6, the two services that use SmoothStreaming as S1 and S2.

We specifically developed the traffic analyzer to be generally applied for all VOD services that adopt the three popular standard HAS techniques. The traffic analyzer parses the manifest based on the specification of the HAS protocols, and builds the mapping between HTTP requests and segments. Since the three streaming protocol implementations have some different properties, the traffic analyzer extracts QoE information with different methodologies based on the protocol each service adopts. We shall mainly describe how the traffic analyzer works with the two most popular protocol implementations HLS and DASH.

HLS vs. DASH

HTTP Live Streaming (HLS) is a media streaming protocol proposed by Apple Inc. In HLS, a media presentation is described by a Master Playlist, which specifies the resolution, bitrate and the URL of corresponding Media Playlist of each track. The URL and duration of media segments are specified in the Media Playlist. Each media segment in HLS is a separate media file. At the beginning of playback, the client downloads the Master Playlist to obtain information about each track. After it decides to download segments from a certain track, it downloads the corresponding Media Playlist and gets the URI of each segment.

Compared with HLS, the Dynamic Adaptive Streaming over HTTP (DASH) is an international standard specifying formats to deliver media content using HTTP. Media content in DASH is described by the Media Presentation Description (MPD), which specifies each track's declared bitrate, segment duration and URI etc. Each media segment can be a separate media file or a sub-range of a larger file. The byte-range and duration of segments may be directly described in the MPD. The MPD can also put such information in the Segment Index Box (sidx) of each track and specify the URI of sidx. The sidx contains meta information about the track and is usually placed at the beginning of the media file.

To accommodate the differences across the HAS protocol and service variations, the traffic analyzer works as follows. It gets the bitrate of each track from the Master Playlist for HLS, and then extracts the URI and duration of each segment from it. For DASH, it gets the bitrate of each track from the MPD, and generates the mapping of byte ranges to segment information using different data sources for different apps. D2, D3 and D4 put such information into the sidx of each track, while D1 directly encodes it in the MPD. D3 encrypts the MPD file in application layer before sending it through the network. However, the sidx is not encrypted and we can still get segment durations and sizes.

UI Monitor

The UI monitor aims at exposing QoE metrics that can be obtained from the app UI on the client. Based on our exploration of all the VOD apps in our study, we identify the seekbar to be a commonly used UI element that indicates the playing progress, i.e. the position of displayed frames in the video in time.

We investigated how to robustly capture the seekbar information. As the UI appearance of the seekbar has a significant difference across different apps, we do not resort to image process techniques. Instead, we use the Xposed framework, an Android framework which enables hooking Android system calls without modifying apps, to log system calls from the apps to update the seekbar.

We found that despite the significant difference in visual appearance, the usage of the seekbar is similar across the services. During playback, the players update the status of the seekbar periodically using the Android API ProgressBar.setProgress. Thus, we obtained information about playback progress and stall events from the API calls. The update may occur even when the seekbar is hidden on the screen. This methodology can be generally applied to apps that use the Android seekbar component regardless of the UI layout and visual appearance.

For the all apps we studied, the progress bar was updated at least every second and we can therefore get the current playing progress at a 1 second granularity.

Buffer Inference

The client playback buffer status, including the occupancy and the information regarding segments in the buffer, is helpful for characterizing the player's behavior. We inferred the buffer occupancy by combining information from the downloading process and the playback process, collected by the traffic analyzer and UI monitor respectively: at any time, the difference between the downloading progress and playing progress should be the buffer occupancy, and the details, such as the bitrate, and duration of the segments remaining in the buffer, can be extracted from the network traffic.

Network Emulator

We used the Linux tool tc to control the available network bandwidth to the device across time to emulate various network conditions.

To understand designs such as the adaptation logic, we applied carefully designed network bandwidth profiles. For instance, to understand how players adapt to network bandwidth degradation, we designed a bandwidth profile where the bandwidth stays high for a while and then suddenly drops to a low value. In addition, to identify QoE issues and develop best practices for cellular scenarios, it is helpful to compare the QoE of the different services in the context of real cellular networks. To enable repeatable experimentations and provide apples-to-apples comparisons between different services, we also replayed multiple bandwidth traces from real cellular networks over WiFi in the lab for evaluating the services.

Figure 11:
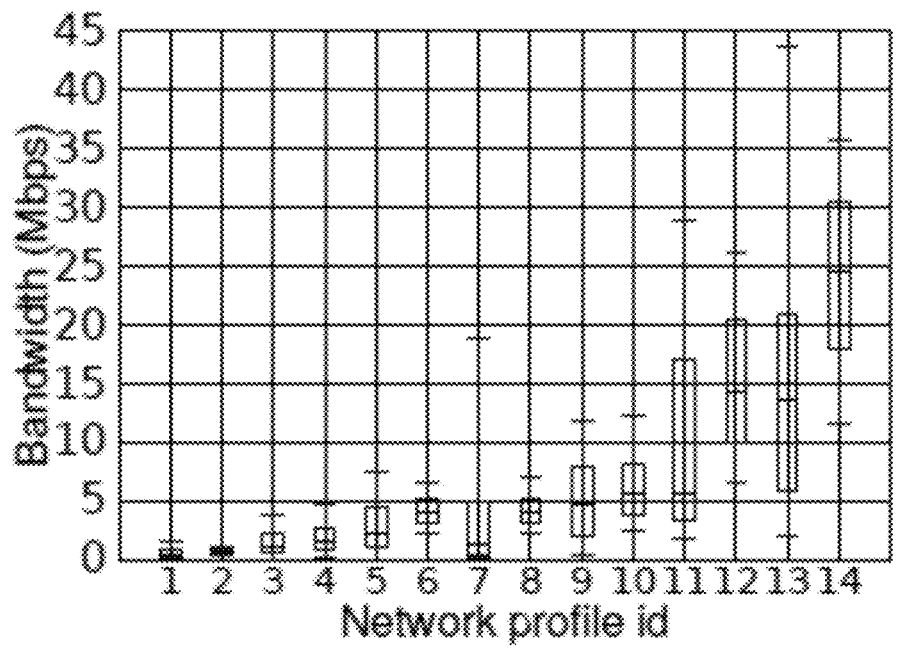
FIG. 11 depicts a plurality of cellular network bandwidth profiles.
Figure 12:
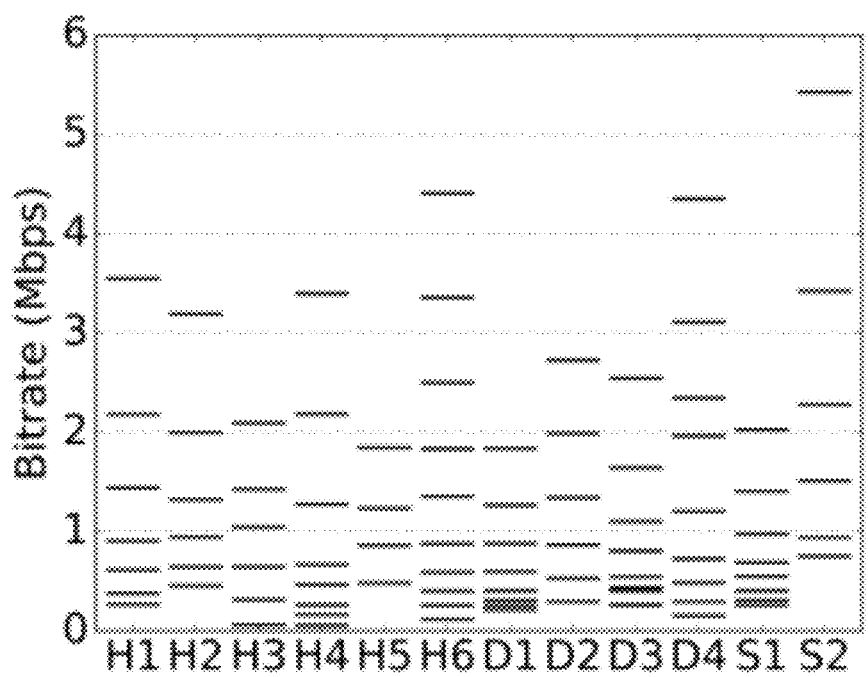
FIG. 12 depicts declared bitrates of tracks for different services employing HAS.

To collect real world bandwidth traces, we downloaded a large file over the cellular network and record the throughput every second. We collected 14 bandwidth traces from real cellular network in various scenarios covering different movement patterns, signal strength and locations. We sorted them based on their average bandwidth and denote them from Profile 1 to Profile 14 (see FIG. 11).

We ran each of the services with the 14 collected cellular bandwidth traces. Each experiment lasts for 10 minutes and is repeated for several runs to eliminate temporary QoE issues caused by the external environment, e.g. transient server load.

Service Characterization

The interactions between different components of each VOD service across multiple protocol layers on both the client and server side together may ultimately determine the QoE. Using our methodology, for each service, we identified design choices around three key components: the server, the transport layer protocols, and the client, and investigate their QoE implications. We summarize the various designs in Table 1.

TABLE 1

Design choices

| | Designs | H1 | H2 | H3 | H4 | H5 | H6 | D1 | D2 | D3 | D4 | S1 | S2 |
|---|---|---|---|---|---|---|---|---|---|---|---|---|---|
| Server | Segment duration (s) | 4 | 2 | 9 | 9 | 6 | 10 | 5* | 5 | 2 | 6 | 2 | 3* |
| | Separate audio track | N | N | N | N | N | N | Y | Y | Y | Y | Y | Y |
| Transport layer | Max # TCP | 1 | 1 | 1 | 1 | 1 | 1 | 6 | 2 | 3 | 3 | 2 | 2 |
| | Persistent TCP | Y | N | N | Y | N | Y | Y | Y | Y | Y | Y | Y |
| Startup | Startup buffer (s) | 8 | 8 | 9 | 9 | 12 | 10 | 15 | 5 | 8 | 6 | 16 | 6 |
| | Startup bitrate (Mbps) | 0.63 | 1.33 | 1.05 | 0.47 | 1.85 | 0.88 | 0.41 | 0.3 | 0.4 | 0.67 | 1.35 | 0.76 |
| Download control | Pausing threshold (s) | 95 | 90 | 40 | 155 | 30 | 80 | 182 | 30 | 120 | 34 | 180 | 30 |
| | Resuming threshold (s) | 85 | 84 | 30 | 135 | 20 | 70 | 178 | 25 | 90 | 15 | 175 | 4 |
| With constant bw | Stability | Y | Y | Y | Y | Y | Y | Y | Y | N | Y | Y | Y |
| | Aggressiveness | N | N | N | N | N | N | Y | N | Y | N | Y | N |
| With varying bw | Decrease buffer (s) | — | 40 | — | — | — | — | — | — | 30 | — | 50 | — |

*The audio segment duration of D1 and S2 is 2 s.

Our measurements reveal a number of interesting QoE impacting issues caused by the various design choices, as shown in Table 2.

TABLE 2

Identified QoE-impacting issues

| Design factors | Problem | QoE impact | Affected service |
|---|---|---|---|
| Track setting | The bitrate of lowest track is set high | Frequent stalls | H2, H5, S1 |
| Encoding scheme | Adaptation algorithms do not consider actual segment bitrate. | Low video quality | D2 |
| TCP utilization | Audio and video content downloading progress is out of sync when using multiple TCP connections. | Unexpected stalls | D1 |
| TCP persistence | Players use non-persistent TCP connections. | Low video quality | H2, H3, H5 |
| Download control | Players to not resume downloading segments until the buffer is almost empty. | Frequent stalls | S2 |
| Startup logic | Players start playback when only one segment is downloaded. | Stall at the beginning | H3, H4, H6, D2, D4 |
| Adaptation logic | The bitrate selection does not stabilize with constant bandwidth. | Extensive track switches | D1 |
| | Players ramp down selected track with high buffer occupancy. | Low video quality | H1, H4, H6, D1 |
| | Players can replace segments in the buffer with ones of worse quality. | Waste data and low video quality | H1, H4 |

Server Design

At the server-side, the media may be encoded into multiple tracks with different bitrates, with each track broken down into multiple segments, each corresponding to a few seconds worth of video. Understanding these server-side settings is important as they have an impact on the adaptation process and therefore the QoE.

For each service, we analyzed the first 9 videos on the landing page which span different categories. We found that for all studied services, for the 9 videos in the same service, the settings are either identical or very similar. We selected one of these videos as a representative sample to further illustrate the design for each service.

Separate Audio Track.

The server can either encode separate audio tracks or multiplex video and audio content in the same track. Using separate audio tracks decouples video and audio content, and gives a service more flexibility to accommodate different audio variants for the same video content, e.g. to use a different language or a different audio sample rate. We analyzed a service's manifest to understand whether the service encodes separate audio tracks. We found that all the studied services that use HLS do not have separate audio tracks, while all services that use DASH or SmoothStreaming encode separate audio tracks.

Track Bitrate Setting.

Track settings such as track count (number of tracks), the properties of the highest and lowest tracks, and the spacing (bitrate difference) between consecutive tracks all impact HAS adaptation and therefore the QoE. We obtained the track declared bitrate from the manifest of each service.

The highest track represents the highest quality that a service provides. We found across the services the highest track has diverse bitrates from 2 Mbps to 5.5 Mbps. Note that the declared bitrate is not the only factor that determines video quality, as it also depends on other factors such as encoding efficiency.

The bitrate of the lowest track impacts the players' ability to sustain seamless playback under poor network conditions. Apple recommends that the lowest track should be below 192 kbps for cellular network. However, the lowest track of 3 services is higher than 500 kbps and significantly increases the possibility of having stalls with slow network connection. For example, our evaluations show with the two lowest bandwidth profiles, H5 always stalls for more than 10 seconds, while apps with lower bit-rate bottom tracks such as D2 and D3 do not have stalls under the same network conditions. Because stalls severely impact QoE, we suggest setting the bitrate of the bottom track to be reasonably low for mobile networks.

Tracks in between the highest and lowest track need to be selected with proper inter-track spacing. If adjacent tracks are set too far apart, the client may often fall into situations where the available bandwidth can support streaming a higher quality track, but the player is constrained to fetch a much lower quality, due to the lack of choices. If adjacent tracks are set too close to each other, the video quality improves very little by switching to the next higher track and the higher track count unnecessarily increases server-encoding and storage overheads. Apple recommends adjacent bitrate to a factor of 1.5 to 2 apart.

CBR/VBR Encoding.

Services can use two types of video encoding scheme, i.e. Constant Bitrate (CBR) encoding which encodes all segments into similar bitrates, and Variable Bitrate (VBR) encoding which can encode segments with different bitrates based on scene complexity.

We examined the distribution of bitrates across segments from the same track to determine the encoding. We got segment duration information from the manifest. To get segment sizes, for services using DASH, we directly got segment sizes from the byte range information provided by the manifest and sidx. For services using HLS and SmoothStreaming, we got the media URLs from the manifest file and use curl to send HTTP HEAD requests to get the media size. We found that 3 services use CBR, while the others use VBR with significant different actual segment bitrates in a single track. For example, the peak actual bitrate of D1 is twice the average actual bitrate.

Figure 13:
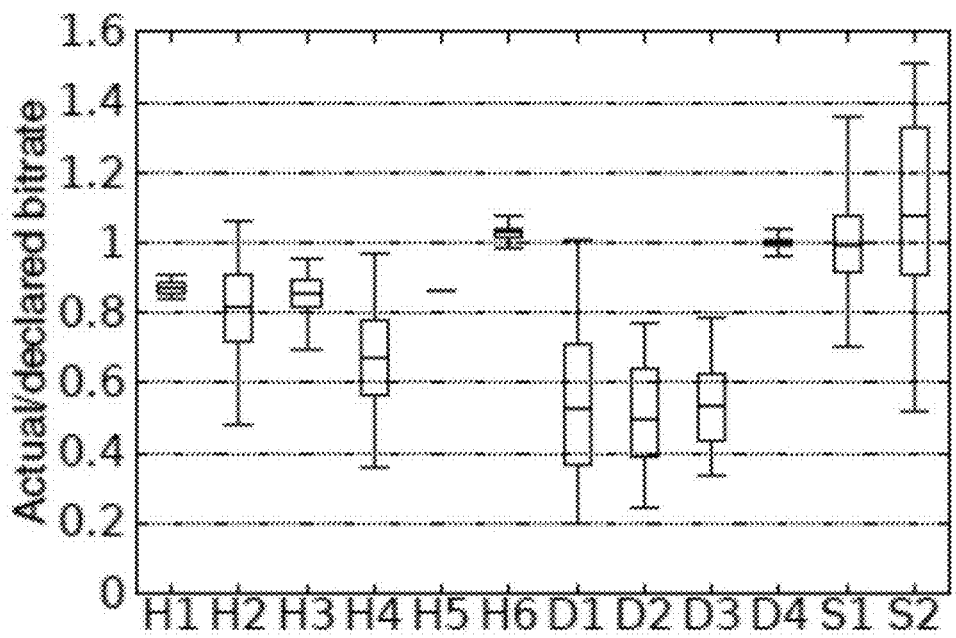
FIG. 13 depicts a distribution of actual bitrate normalized by the declared bitrates of FIG. 12.

With VBR encoding, using a single declared bitrate to represent the required bandwidth is challenging. We looked into how services set the declared bitrate. For the highest track of each service, we examined the distribution of actual segment bitrates normalized by the declared bitrate. As shown in FIGS. 13, S1 and S2 set the declared bitrate around the average actual bitrate, while other services set the declared bitrate around the peak actual bitrate.

Segment Duration.

The setting of segment duration involves complex tradeoffs. A short segment duration enables the client to make track selection decision in finer time granularity and adapt better to network bandwidth fluctuations, as segments are the smallest unit to switch during bitrate adaptation. On the other side, a long segment duration can help improve encoding efficiency and reduce the server load, as the number of requests required to download the same duration of video content reduces. We found significant differences in the segment duration across the different services, ranging from 2 seconds to as long as 10 seconds (see Table 1). In addition, other factors such as startup buffer duration need to be set based on the segment duration to ensure good QoE.

Transport Layer Design

In HAS, players use the HTTP/HTTPS protocol to retrieve segments from the server. However, how the underlying transport layer protocols are utilized to deliver the media content depends on the service implementation. All the VOD services we studied use TCP as the transport layer protocol.

TCP Connection Count and Persistence.

As illustrated in Table 1, all studied apps that adopt HLS use a single TCP connection to download segments. 3 of these apps use non-persistent TCP connections and establish a new TCP connection for each download. This requires TCP handshakes between the client and server for each segment and TCP needs to go through the slow start phase for each connection, degrading achievable throughput and increasing the potential of suboptimal QoE. We suggest apps use persistent TCP connections to download segments. All apps that adopt DASH and SmoothStreaming use multiple TCP connections due to separated audio and video tracks. All these connections are persistent.

TCP Connection Utilization.

Utilizing multiple TCP connections to download segments in parallel brings new challenges. Some apps such as D1 use each connection to fetch a different segment. Since concurrent downloads share network resources, increasing the concurrency can slow down the download of individual segments. This can be problematic in some situations (especially when either the buffer or bandwidth is low) by delaying the arrival of a segment with a very close playback time, increasing the potential for stalls. Different from these apps, D3 only downloads one segment at a time. It splits each video segment into multiple subsegments and schedules them on different connections. To achieve good QoE, the splitting point should be carefully selected based on per connection bandwidth to ensure all sub-segments arrive in similar time, as the whole segment needs to be downloaded before it can be played. The above highlights that developing a good strategy to make efficient utilization of multiple TCP connections requires considerations of complex interactions between the transport layer and application layer behavior.

Figure 14:
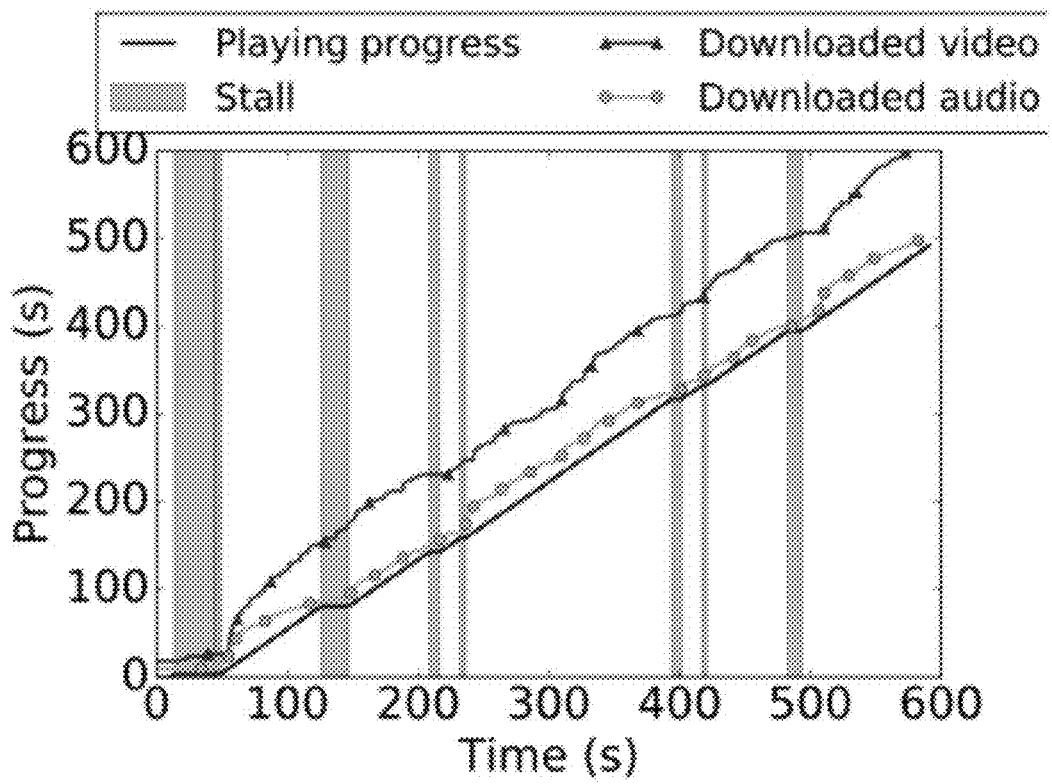
FIG. 14 depicts an exemplary downloading progress of video and audio content for one of the services of FIG. 12 using HAS.

When audio and video tracks are separate, the streaming of audio and video segments are done separately. Since both are required to play any portion of the video, there should be adequate synchronization across the two download processes to ensure that both contents are available by the designated playback time of the segment. Our evaluations reveal that uneven downloads for audio and video lead to clear QoE impairments for some apps. For example, we find D1 uses multiple TCP connections to download audio and video content in parallel, but its download progresses for audio and video content can have significant differences, especially when the network bandwidth is low. For the two network profiles with the lowest average bandwidth, the average difference between video and audio downloading progress is 69.9 seconds and 52.5 seconds respectively. In the example shown in FIG. 14, buffered video content is always more than audio content. When stalls occur, the buffer still contains around 100 seconds of video content. In this case, the stalls could have been avoided, without using any additional network resources, by just reusing some of the bandwidth for fetching more audio and a little bit less video. We suggest ensuring better and tighter synchronization between audio and video downloads.

Client-Side Design

The client player is a core component that impacts QoE by performing intelligent adaptation to varying network conditions. We stress tested the different players using the 14 bandwidth profiles collected from various scenarios. By comparing the behavior across different services under identical network conditions, we are able to identify interesting client behaviors and pinpoint potential QoE problems. More specifically, we used blackbox testing to study how players behave at startup, i.e. the startup logic, when they load the next segment, i.e. the download control policy and what segment they load, i.e. the adaptation logic.

Startup Logic.

We characterize two properties in the startup phase, startup buffer duration and startup track.

Startup Buffer Duration.

At the beginning of a session, clients need to download a few segments before starting playback. We denote the minimal buffer occupancy (in terms of number of seconds' worth of content) required before playback is initiated as the startup buffer duration.

Setting the startup buffer duration involves tradeoffs as a larger value can increase the initial delay experienced by the user (as it takes a longer time to download more of the video), but too small a value may lead to stalls soon after the playback. To understand how popular services configure the startup buffer, we ran a series of experiments for each service. In each experiment we instrument the proxy to reject all segment requests after the first n segments. We gradually increased n and found the minimal n required for the player to start playback. The duration of these segments is the startup buffer duration. As shown in Table 1, most apps set similar startup duration around 10 seconds.

Startup Track.

The selection of the first segment impacts users' first impression of the video quality. However, at the beginning the player may not have information about network conditions (eg., historical download bandwidths), making it challenging to determine the appropriate first segment.

We examined the startup track of different players in practice. We found each app consistently selects the same track level across different runs. The startup bitrates across apps have high diversity. 4 apps start with a bitrate lower than 500 kbps, while another 4 apps set the startup bitrate higher than 1 Mbps.

Download Control.

One important decision the client makes is determining when to download the next segment. One strategy is to keep fetching segments continuously, greedily building up the buffer to avoid stall events. However, this can be suboptimal as (1) it increases wasted data when users abort the session and (2) it may miss the opportunity to get a higher quality segment if network conditions improve in the future. We observed that, even under stable network conditions, all the apps exhibit periodic on-off download patterns. Combining with our buffer emulation, we found an app always pauses downloading when the buffer occupancy increases to a pausing threshold, and resumes downloading when the occupancy drops below another lower resuming threshold.

We set the network bandwidth to 10 Mbps, which is sufficient for the services to their respective highest tracks. We found 5 apps set the pausing threshold to be around 30 seconds, while other apps set it to be several minutes (Table 1). With a high pausing threshold, the player can maintain a high buffer occupancy to avoid future stall events. However, it may lead to more data wastage when users abort the playback. The different settings among services reflect different points in the decision space around this tradeoff.

The difference between the pausing and resuming threshold determines the network interface idle duration, and therefore affects network energy consumption. 8 apps set the two thresholds to be within 10 seconds of each other. As this is shorter than LTE RRC demotion timer, the cellular radio interface will stay in high energy mode during this entire pause in the download, leading to high energy consumption. We suggest setting the difference of the two thresholds larger than LTE RRC demotion timer in order to save device energy.

Figure 15:
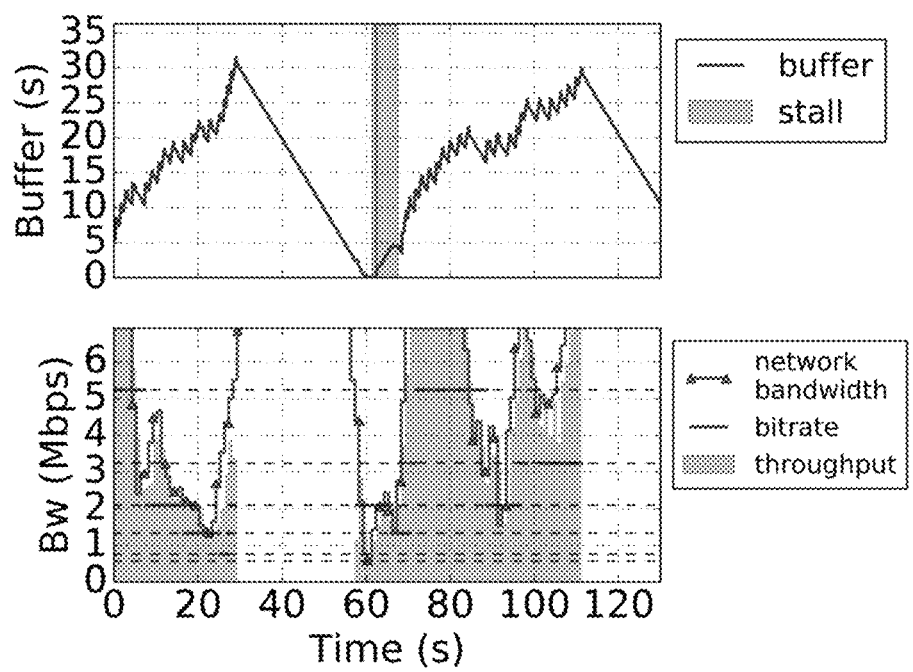
FIG. 15 depicts another exemplary downloading progress of video and audio content for another one of the services of FIG. 12 using HAS.

If either the pausing threshold or the resuming threshold is set too low, the player's ability to accommodate network variability will be greatly limited, leading to frequent stalls. We found that S2 sets the pausing threshold to be only 4 s and has a higher probability of incurring stalls than other services under similar network conditions. As the example in FIG. 15, at 25 seconds, the buffer occupancy of S2 reaches to the pausing threshold and the player pauses downloading for around 30 seconds. When the player resumes downloading segments, the buffer occupancy is only 4 seconds and drains quickly due to temporary poor network condition. As stalls significantly degrade user experience, we suggest setting both thresholds reasonably high to avoid stalls. The exact value will depend on several factors, such as the specific adaptation algorithm.

Next, a good adaption logic should provide high average bitrate and reduce stall events and unnecessary track switches.

Track Selection Under Stable Network Bandwidth.

For each app, we ran a series of experiments within each of which we emulated a specific stable network bandwidth for 10 minutes and examined the resulting track selection in the steady state. A good adaption logic should achieve an average bitrate similar to the network bandwidth without stalls and frequent track switches.

Stability.

Figure 16:
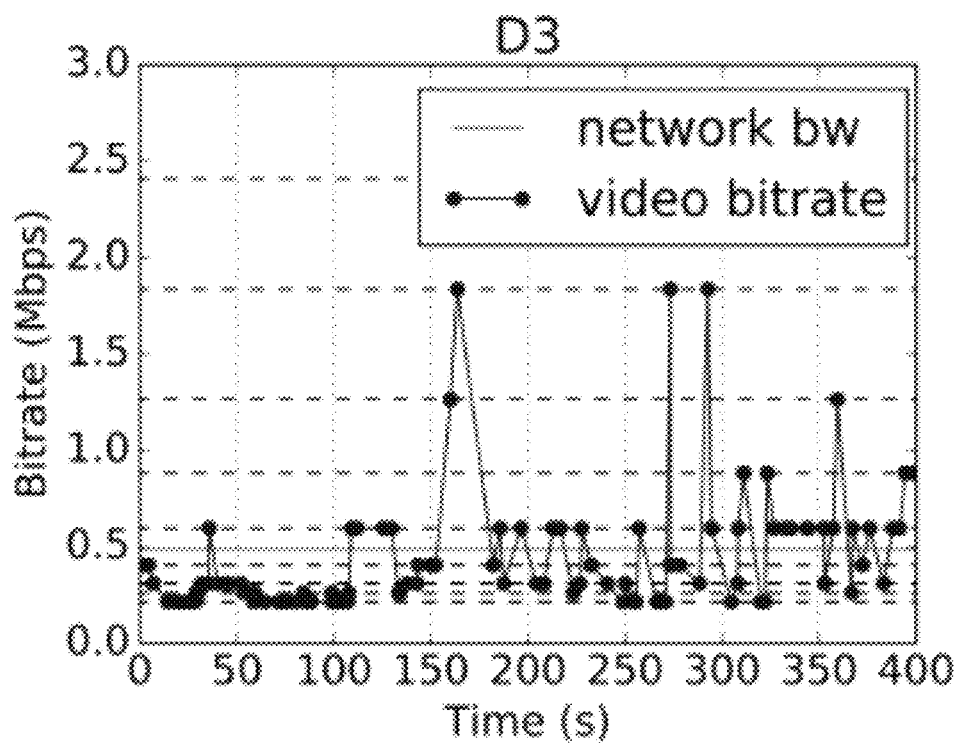
FIG. 16 depicts the decisions one of the services of FIG. 12 regarding downloaded quality, given a constant bitrate.

We found that the selected track of D1 does not stabilize even with constant network bandwidth. As shown in FIG. 16, the network bandwidth is constantly 500 kbps. However, D1 frequently switches between different tracks and tries to improve the average actual bitrate to be close to network bandwidth. However, frequent switches, especially switches between non-consecutive tracks, can impair user experience. In contrast, the other apps all converge to a single track (different for each app) after the initial startup phase. We suggest the adaptation logic avoid unnecessary track switches.

Aggressiveness.

Figure 17:
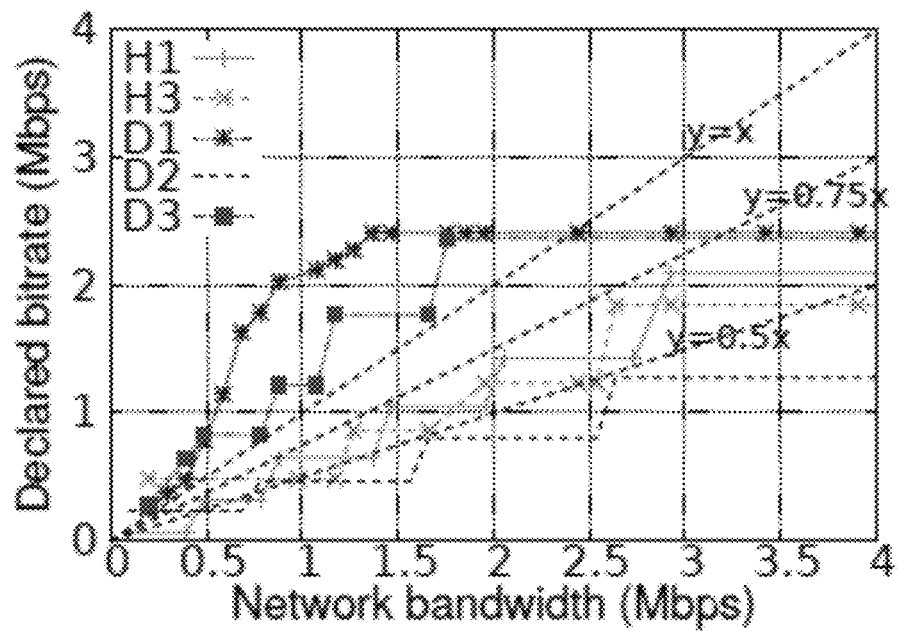
FIG. 17 depicts the decisions several of the services of FIG. 12 regarding downloaded quality, given a constant bitrate.

We found that the track that different apps converge to under the same stable bandwidth condition has significant difference across different services. We term services that converge to a track with declared bandwidth closer to available bandwidth as more aggressive. We show a few examples in FIG. 17. We find 3 apps are more aggressive and select tracks with bitrate no less than the available network bandwidth. The reason why they are able to stream tracks with a bitrate higher than available network bandwidth without stalls is that they use VBR encoding and the actual segment bitrate is much lower than the declared bitrate. The other apps are relatively conservative and select tracks with declared bitrates no more than 75% of the available bandwidth. In particular, D2 even select tracks with declared bitrates no more than 50% of available bandwidth.

Track Adaptation with Varying Network Bandwidths.

To understand the adaptation to varying network condition, we ran each app with a simple "step function" bandwidth profile, i.e. the network bandwidth first stays stable at one value and suddenly changes to another value. We tested different combinations of the initial and final bandwidth steps, and when the step occurs. The behavior across the different apps is summarized in Table 1.

Reaction to Bandwidth Increase.

When bandwidth increases, all apps start to switch to a track with higher bitrate after a few segments. In addition, we found some apps revisit earlier track switching decisions and redownload existing segments in the buffer in an attempt to improve video quality.

Reaction to Bandwidth Decrease.

When bandwidth decreases, apps eventually switch to a track with a lower bitrate.

A higher buffer pausing threshold enables more buffer buildup, which can help apps better absorb bandwidth changing events and defer the decision to select a lower track without the danger of stalls. However, among the 7 apps that have a large buffer pausing threshold (larger than 60 seconds), 4 apps always immediately switch to a low track when a bandwidth degradation is detected, even when the buffer occupancy is high, leading to suboptimal QoE. In contrast, the other 3 apps set thresholds on buffer occupancy above which they do not switch to a lower track even if the available bandwidth reduces. We suggest the adaptation logic takes buffer occupancy into consideration and utilizes the buffer to absorb network fluctuations.

QoE Issues: Deep Dive

Some QoE impacting issues involve complex interactions between different factors. We explored in depth some key issues impacting the services we studied, and use targeted black-box experiments to deduce their root causes. In addition, we further examined whether similar problems exist for ExoPlayer, an open source media player used by more than 10,000 apps including YouTube, BBC, WhatsApp and Periscope etc. Exoplayer therefore provides us a unique view of the underlying design decisions in a state-of-the-art HAS player being increasingly used as the base for many commercial systems. The insights and mitigation strategies we develop from this exploration can be broadly beneficial to the community for improving the QoE of VOD services.

Segment Replacement (SR)

Existing adaptation algorithms try to make intelligent decisions about track selection to achieve the best video quality while avoiding stall events. However, due to the fluctuation of network bandwidth in the mobile network, it is nearly impossible for the adaption logic to always make the perfect decision on selecting the most suitable bitrate in terms of the tradeoff between quality and smoothness. We observed that to mitigate the problem, when the network condition turns out to be better than predicted, some players will discard low quality segments that are in the buffer but have not yet been played, and redownload these segments using a higher quality track to improve user perceived video quality. We denote this behavior of discarding video segments in the buffer and redownloading them with potentially different quality as Segment replacement (SR).

While SR could potentially improve video quality, it does involve some complex tradeoffs. As segments in the buffer are discarded and redownloaded, the additional downloads increase network data usage. In addition, SR uses up network bandwidth which could potentially have been used instead to download future segments and may lead to quality degradation in the future. Existing works find Youtube can perform extensive SR in a non-cellular setting. However, how common SR is used across popular services and the associated cost-benefit tradeoff for cellular networks is not well understood.

Usage and QoE Impact of SR for Popular VOD Apps.

To understand the usage of SR by popular VOD apps, we ran them with the 14 collected network bandwidth profiles. We analyzed the track and index (the position of the segment within the video track) of downloaded segments. As segments with the same index represent the same content, when multiple segments with the same index are observed in the traffic, we confirmed that the player performs SR. Among the players we study, we find H1 and H4 perform SR.

We conducted what-if analysis to characterize the extent of video quality improvement and additional data usage caused by SR. When SR occurs, among the segments with the same index, only the last downloaded segment is preserved in the buffer and all previous downloads are discarded. We confirmed this using the buffer information in the logcat of H1. We emulated the case with no SR by keeping only the first downloaded segment for each index in the trace and use it as a baseline comparison. Our analysis shows that SR as currently implemented by H4, does not work well. The findings are summarized as follows. H1 shows similar trends.

- SR as currently implemented can significantly increase data usage. With 5 of the bandwidth profiles, the data consumption increases by more than 75%. The median data usage increase is 25.66%.
- For most bandwidth profiles, the video quality improves marginally. The median improvement in average bitrate across the 14 profiles is 3.66%.
- Interestingly, we found SR can even degrade video quality. For one profile, SR decreases the average bitrate by 4.09% and the duration for which tracks higher than 1 Mbps are streamed reduces by 3.08%.

Diving deeper, for each experimental run, we emulated the client buffer over time. When a new segment is downloaded, if the buffer already contains a segment with the same index, we replaced the previously buffered segment with the newly downloaded one and compared their quality. A somewhat counter-intuitive finding is that the redownloaded segments were not always of higher quality. Across the 14 bandwidth profiles, for all SR occurrences, on average respectively 21.31% and 6.50% of redownloaded segments were of lower quality or same quality as the replaced segment. These types of replacements are undesirable, as they use up network resources, but do not improve quality.

To understand why H4 redownloads segments with lower or equal quality, we analyzed when and how H4 performs SR. We made the following observations.

How SR is Performed.

We found that after H4 redownloads a segment, it always redownloads all segments that are in the buffer with indexes higher than that segment. In other words, it performs SR for multiple segments proactively and does not just replace a segment in the middle of the buffer. In all SR occurrences across the 14 profiles, the 90th percentile of the number of contiguously replaced segments was 6 segments.

When SR is Triggered.

Whenever H4 switches to a higher track, it always starts replacing some segments in the buffer. For all runs with the 14 bandwidth profiles, each time SR occurs, we examined the quality of the first replaced segment among the contiguous replaced ones. We find in 22.5% of SR cases, even the first redownloaded segment had lower or equal quality compared with the one already in the buffer. This implies that H4 may not properly consider the video quality of buffered segments when performing SR.

Figure 18:
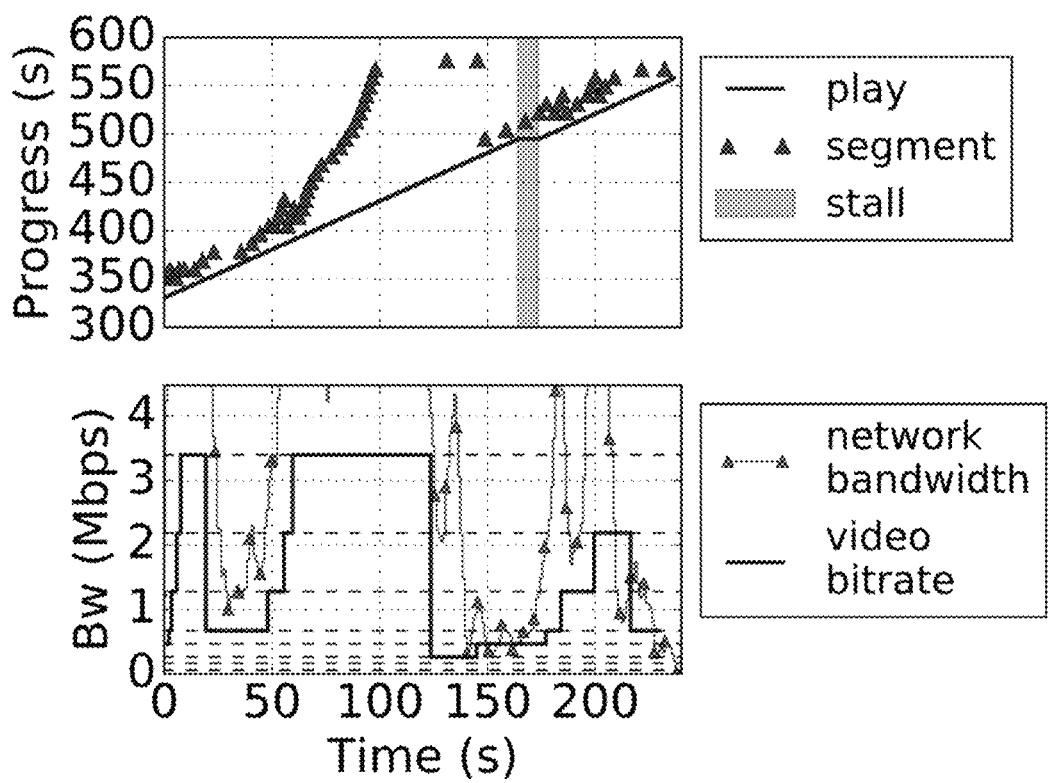
FIG. 18 depicts another exemplary downloading progress of video and audio content for another one of the services of FIG. 12 using HAS.

We show an example of H4 performing SR in FIG. 18. At 150 seconds, H4 switches from Track 3 to Track 4, which triggers SR. Instead of downloading the segment corresponding to 580 seconds of content, it goes back to redownload the segment corresponding to 500 seconds of content. In fact, that segment was already downloaded at 85 seconds with a higher quality from Track 8. As the new downloaded segment is from Track 4, this indicates SR with lower quality. Even worse, H4 keeps redownloading all buffered segments after that. This even causes a stall at 165 seconds, which otherwise could have been avoided.

Deducing the root causes of such suboptimal SR design from commercial players such as H4 is challenging due to their proprietary nature. To gain a deeper understanding into the underlying considerations behind SR policies, we next examined the SR design of the popular open-source ExoPlayer and its QoE implications.

SR Analysis with ExoPlayer.

We find that ExoPlayer version 1 uses SR and suffers from some similar issues as H4, i.e. it can also redownload segments with lower or equal quality. To understand this, we first need to understand Exoplayer's adaptation logic. Before loading each segment the track selection algorithm selects the track based on available network bandwidth and buffer occupancy. When it decides to select a higher track X than the last selected one Y, it initiates SR if the buffer occupancy is above a threshold value. It identifies the segment with the smallest playback index in the buffer that is from a track lower than the track Y that ExoPlayer is about to select for the upcoming download. Beginning with that segment, it discards all segments with a higher index from the buffer. While this strategy guarantees that the first discarded segment is replaced with higher quality one, the same does not hold for the following segments being replaced.

The root cause of these SR-related issues is that the player does not (i) make replacement decision for each segment individually and (ii) limit SR to only replace segments with higher quality. To answer the question why players including H4 and ExoPlayer do not do this, we studied the ExoPlayer code and discovered that it does not provide APIs to discard a single segment in the middle of the buffer. Further investigation shows that this is caused by the underlying data structure design. For efficient memory management, ExoPlayer uses a double-ended queue to store segments ordered by the playback index. Network activities put new segments on one end, while the video renderer consumes segments on the other end, which ensures that the memory can be efficiently recycled. Discarding a segment in the middle is not supported, and thus to perform SR, the player has to discard and redownload all segments with higher indexes than the first chosen one.

We found that the underlying data structure and SR logic remain the same in the latest Exoplayer version 2, but that SR is currently deactivated and marked for future activation. To understand the reasons behind ExoPlayer's approach to SR, we contacted its designers. They communicated that they were concerned about the additional complexity and less efficient memory allocation associated with allowing a single segment in the middle to be discarded, and uncertainty about the benefits of SR. They were also concerned that allowing discard for a single segment introduces some dependency between the track selection algorithm and other modules such as buffering policy.

SR Best Practices and Improvement Evaluation.

The response from ExoPlayer developers motivated us to look into how useful SR is when designed properly and whether it is worthwhile to implement it. A proper SR logic should have one or more of the following properties.

The logic considers replacing a segment a time. Each segment is replaced individually.

Segments can only be replaced by higher quality segments.

When buffer occupancy drops below a threshold, the player should stop performing more replacements and resume fetching future segments to avoid the danger of stalls.

Changing the Exoplayer memory management implementation to enable discarding individual segments is a non-trivial endeavor. Instead, for our evaluations, we modified the Exoplayer track selection logic to work with HTTP caching to achieve the similar end-results. As an example, when segments are discarded from the buffer, their track information is recorded. Later if the track selection logic determines to redownloaded them with quality no higher than the discarded ones, we changed the track selection to select the track of the discarded segment so that they can be recovered directly from the local cache on the device without sending traffic to the network. From the network perspective, this would have a similar effect as not discarding the segment.

To evaluate the QoE impact of the improved SR algorithm, we played a publicly available DASH stream using the 14 collected real world bandwidth profiles. We found that, across the profiles, the median and 90th percentile improvements in average bitrate are 11.6% and 20.9% respectively.

Figure 19:
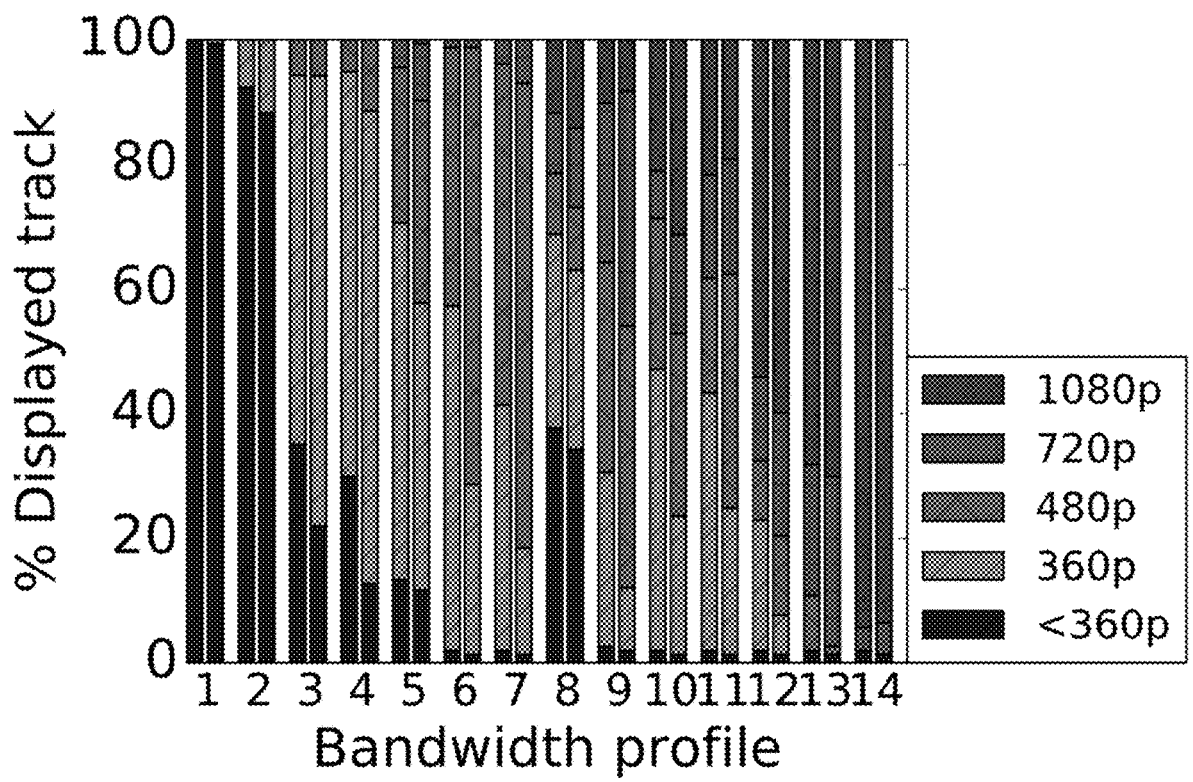
FIG. 19 depicts a displayed track percentage with and without segment replacement techniques being employed.

Subjective QoE studies show that the video bitrate is not linearly proportional to user QoE. Rather, increasing the bitrate when bitrate is low will cause a much sharper increase in user experience. But when bitrate is already high, further increasing the bitrate does not lead to significant additional QoE improvements. In other words, it is more important to reduce the duration of time that really low quality tracks are streamed. Thus we further broke down the track distribution of displayed segments without and with SR. As shown in FIG. 19, when network bandwidth shows significant fluctuation and players have chances to switch between tracks, a properly designed SR strategy can greatly reduce the duration of streaming low tracks. For bandwidth profiles 3 and profile 4, the duration of streaming tracks lower than 360p reduces by 32.0% and 54.1% respectively. For profile 7 to profile 12, the duration of streaming tracks worse than 480p reduces significantly, reduction ranging from 30.6% to 64.0%.

SR increases video bitrate at the cost of increasing network data usage. For ExoPlayer with our improved SR algorithm, the median data usage increase across 14 profiles is 19.9%. For 5 profiles, the usage increases by more than 40%. Across the 14 profiles, the median amount of wasted data, i.e. data associated with downloading segments that were later discarded, as a proportion of the total data usage was 10.8%. This implies that SR should be performed carefully for users with limited data plans.

To better make tradeoff between data usage and video quality improvement, we suggest only discarding segments with low quality when data usage is a concern. As we shall see, discarding segments with lower bitrate has a bigger impact on improving QoE and causes less waste data. To evaluate the proposed concept, we changed the SR algorithm to only replace segments no better than a threshold of 720p, and characterize the impact on data usage and video quality. We tested with three profiles with the largest amount of waste data. Compared with the case of using no such threshold, for the 3 profiles, the wasted data reduced by 44% on average, while the proportion of time that streaming quality better than 720p was played stayed similar.

In summary, we find proper usage of SR significantly reduces the duration of streaming tracks with poor quality and improves QoE. When making replacement decisions, players should consider each segment individually and only replace segment with higher quality. This requires underlying implementation to support discarding a segment in the middle of the buffer. Due to the implementation complexities, creating a library that supports such operations can greatly benefit the app developer community.

Using Declared Vs. Actual Bitrate

Servers specify the declared bitrate for each track in the manifest as a proxy for its network resource needs, to help client players select proper tracks based on the network bandwidth. However, especially for VBR encoding which is increasingly popular, a single declared bitrate value cannot accurately reflect the actual bitrate across the video. For example, as shown in FIG. 13, the declared bitrate of videos from D2 can be twice of the average actual bitrate. Despite the potentially significant difference between the declared bitrate and actual bitrate, we found that the adaptation logic in some players such as D2 relies purely on the declared bitrate to make track selection decisions, leading to suboptimal QoE.

Figure 20:
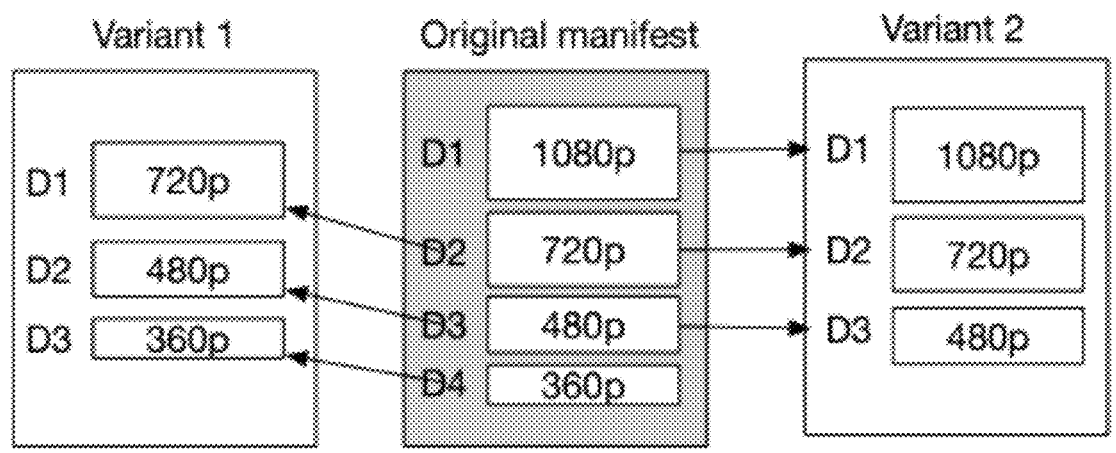
FIG. 20 depicts two manifest variants with tracks of the same declared bitrate but different actual bitrates.

Since D2 uses DASH, it can in theory obtain actual segment bitrates from segment index boxes before playback. To verify whether D2 takes the actual bitrate into consideration during track selection, we carefully design black-box testing experiments to reveal its internal logic. We modified the manifest to generate two variants with tracks of the same declared bitrate but different actual bitrates. As illustrated in FIG. 20, in variant 1 we shifted the mapping between the declared bitrate and corresponding media files. We replaced the media of each track to the one with the next lower quality level, while keeping the declared bitrate the same. In variant 2, we simply removed the lowest track and keep other tracks unchanged to keep the same number of tracks as variant 1. Thus, comparing these two variants, each track in variant 1 has the same declared bitrate as the track of the same level in variant 2, but the actual bitrate is the same as that of the next lower track in variant 2. We used D2 to play the two variants using a series of constant available bandwidth profile. We observed that with the same bandwidth profile, the selected tracks for the two variants are always of the same level with the same declared bitrate. This suggests that it only considers the declared bitrate in its decision on which track to select next, else the player would select tracks with different levels for the two variants but with the same actual bitrate.

As the average actual bitrate of videos from D2 is only half of declared bitrate, failure to consider the actual bitrate can lead to low bandwidth utilization, and thus deliver suboptimal QoE. We used D2 to play original videos from its server with a stable 2 Mbps available bandwidth network profile. The average achieved throughput is only 33.7% of the available bandwidth in the steady phase. Such low bandwidth utilization indicates that D2 could potentially stream higher quality video without causing stalls.

There are historical factors underlying the above behavior. HLS was the first widely adopted HAS streaming protocol for mobile apps, and some elements of its design meshed well with the needs of the predominant encoding being used at the time, i.e. CBR. For example, the HLS manifest uses a single declared bitrate value to describe the bandwidth requirements for each track. This is the only information available to the player's track selection logic regarding the bandwidth needs for a segment in a track, before actually downloading the segment. HLS requires setting this value to the peak value for any segment in the track. With CBR encoding, different segments in a track have similar actual bitrates, making the declared bitrate a reasonable proxy for the actual resource needs. Adaptation algorithms therefore traditionally have depended on the declared bitrate to select tracks.

More recently, HAS services have been increasingly adopting VBR video encodings as shown in FIG. 13, which offers a number of advantages over CBR in terms of improved video quality. However, different segments in a VBR encoded track can have very different sizes due to factors such as different types of scenes and motion.

As the actual bitrate of different segments in the same track can have significant variability, it becomes challenging to rely on a single declared bitrate value to represent all the segments in a track. With VBR encoding, setting the declared bitrate to average actual bitrate can lead to stall events. On the other hand, setting the declared bitrate to the peak rate and using that as an estimate for a track's bandwidth (as D2 seems to do) can lead to low bandwidth utilization and suboptimal video quality. The solution to the above is that (i) more granular segment size information should be made available to the adaptation algorithm and (ii) the algorithm should utilize that information to make more informed decisions about track selection.

HAS protocols are moving towards making this granular information available, but challenges remain. DASH and newer versions of HLS support storing each segment as a sub-range of a media file and expose the segment byte ranges and durations in the manifest file which can be used to determine the actual bitrate for each segment. HLS also supports reporting the average bitrate in the manifest along with the peak bitrate. However, we find that the information may still not be exposed to the adaptation algorithm. We checked the implementation of ExoPlayer version 2. It provides a unified interface to expose information based on which an adaptation algorithm selects tracks. However, the interface only exposes limited information including track format, declared bitrate, buffer occupancy and bandwidth estimation. It does not expose the actual segment-level bitrate information that is included in the manifest file. This implies that even though app developers can implement customized sophisticated adaptation algorithms, in Exoplayer, currently they still can not leverage actual bitrate information to select tracks.

We next demonstrated that an adaptation algorithm that considers actual segment bitrates can improve QoE. We adjusted ExoPlayer's default adaptation algorithm to select the track based on the actual segment bitrate instead of the declared bitrate. To evaluate the performance, we VBR-encoded the Sintel test video and created an HLS stream consisting of 7 tracks. For each track we set the peak bitrate (and therefore the declared bitrate) to be twice of the average bitrate. We played the video both with the default adaptation algorithm and the modified algorithm that considers actual bitrate using the 14 collected network profiles.

Figure 21:
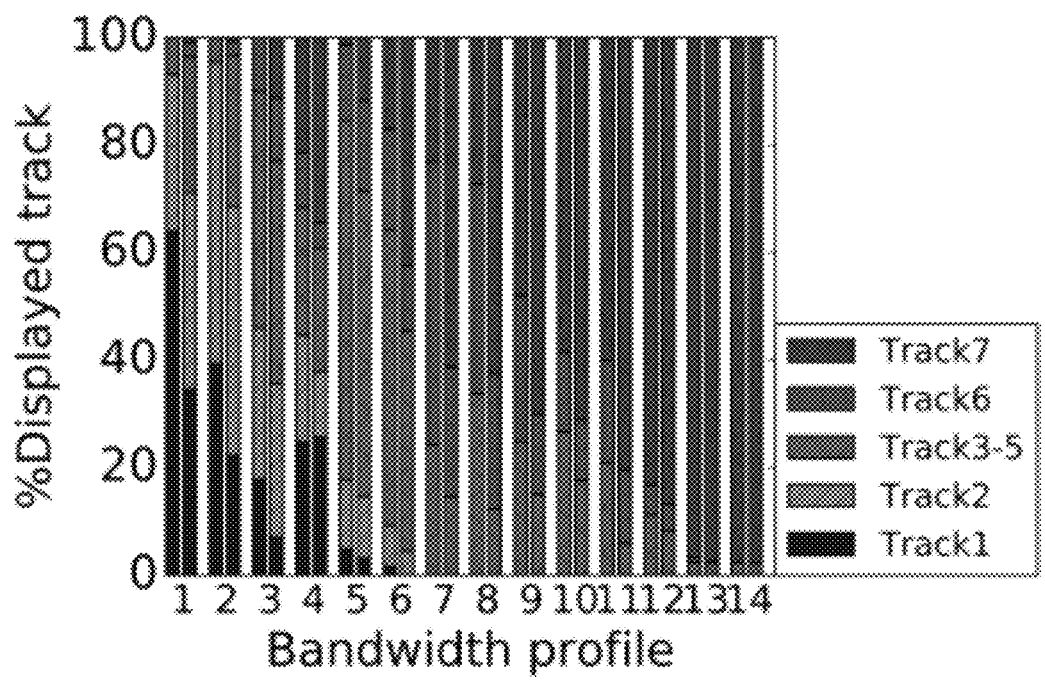
FIG. 21 depicts a displayed track percentage with and without considering actual segment bitrate.

As shown in FIG. 21, when actual bitrate is considered, the duration of playing content with low quality reduces significantly. Across the 14 network profiles the median of average bitrate improvements is 10.22%. For the 3 profiles with the lowest average bandwidth, the duration for which the lowest track is played reduces by more than 43.4% compared with the case of considering only the declared bitrate for track selection. Meanwhile, for all profiles we observed the stall duration stays the same, except for one profile, where it increases marginally from 10 seconds to 12 seconds. Note that the above results just illustrate the potential of using fine grained segment size information.

In summary, we suggest the services should expose actual segment bitrate information to the adaptation logic, and that the adaptation logic should utilize such information to improve track selection.

Improving Startup Logic

Figure 22:
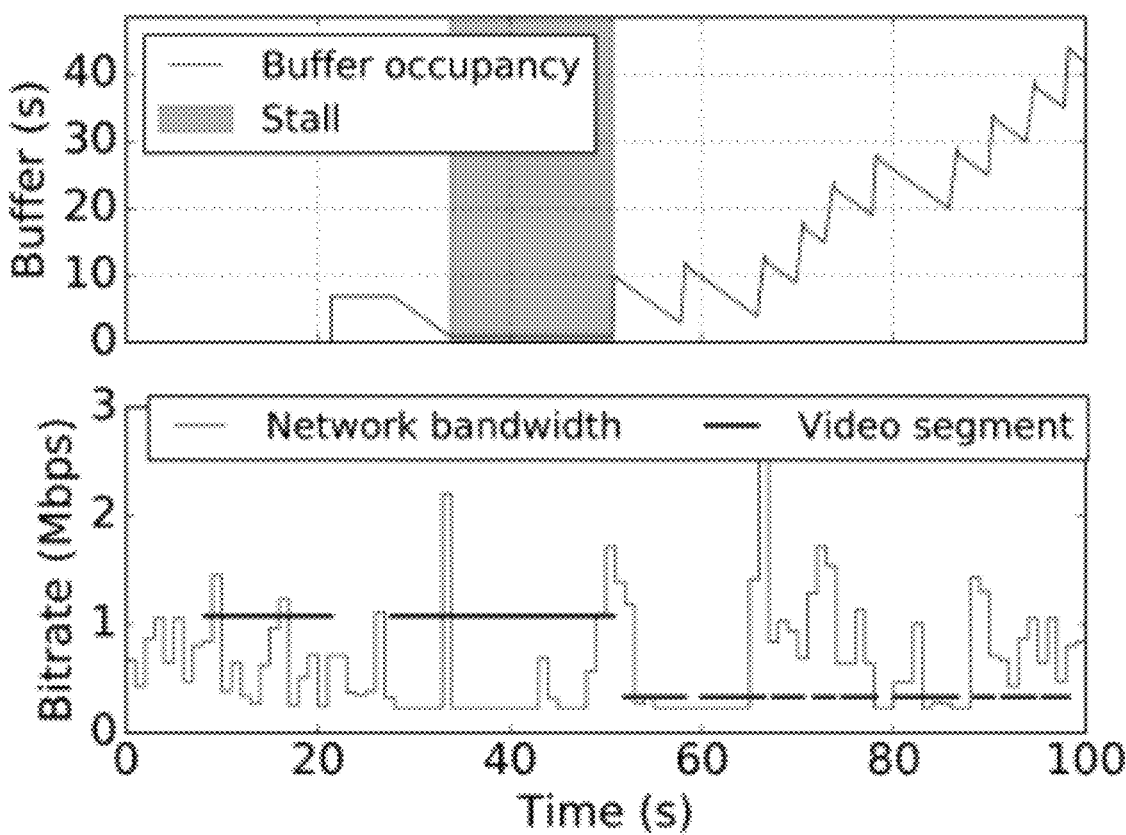
FIG. 22 depicts another exemplary downloading progress of video and audio content for another one of the services of FIG. 12 using HAS.

We found that some apps such as H3 always have stalls at the beginning of playback with certain network bandwidth profiles, while other apps do not have stalls under the same network condition. This indicates potential problems with the startup logic. As shown in FIG. 22, H3 first selects the track with a bitrate around 1 Mbps, which is higher than the available network bandwidth. It starts playback after downloading the first segment. For the second segment it keeps selecting the same track as it may not yet have built up enough information about the actual network condition. As the network bandwidth is lower than selected bitrate, the buffer goes empty before the second segment is downloaded, leading to a stall.

We found H3 and H2 set similar startup buffer durations. However, H2 does not encounter stalls with the same network, while H3 does. Further analysis shows that each segment of H2 is only 2 seconds long and it downloads 4 segments before starting playback, while the segment duration for H3 is 9 seconds and it starts playback once a single segment is downloaded. Based on this observation, we found that the likelihood of having stalls at the beginning of playback does not only depend on the startup buffer duration in seconds but also on the number of segments in the buffer. Using just 1 segment as startup buffer introduces a high possibility to have stalls at the beginning of playback.

Figure 23:
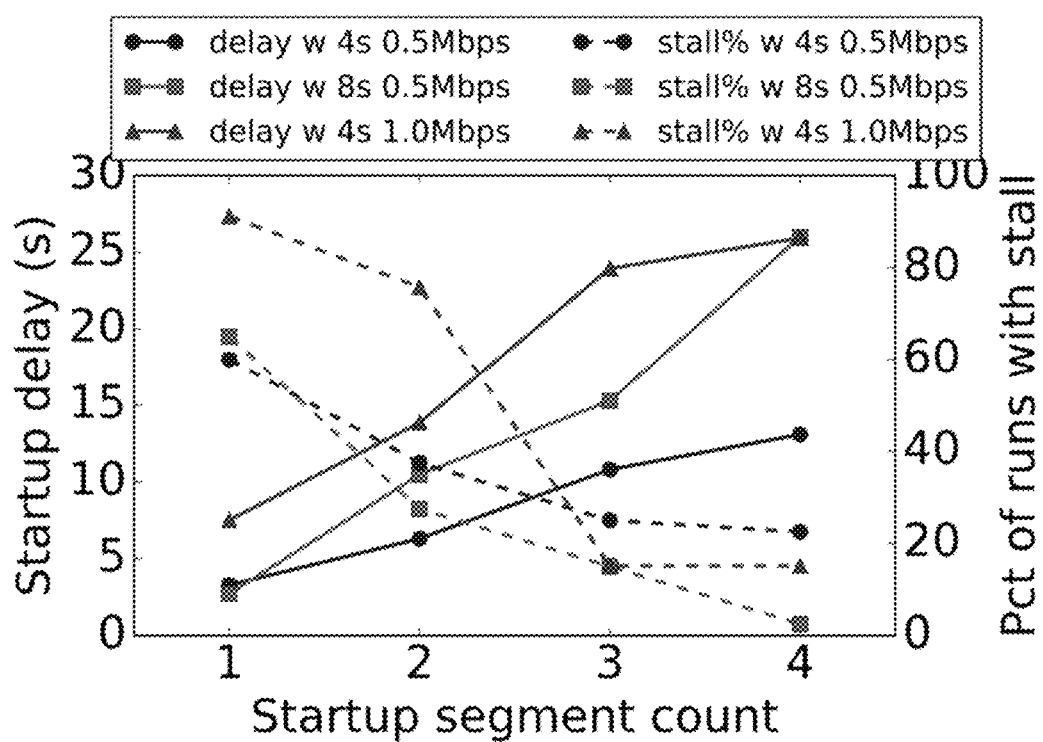
FIG. 23 depicts a comparison of different start-up track settings used by different embodiments.

Next, we characterized the tradeoff brought by startup buffer duration setting between resulting startup delay and stall likelihood at the beginning of a video session, and propose suggestions for determining the setting empirically. We instrumented ExoPlayer to set different startup buffer durations and play the Testcard stream, a publicly available DASH stream, with different segment durations. We also configured the player to use different startup track settings. We calculated the average startup delay and the stall ratio, i.e. ratio of runs with stalls, with 50 bandwidth profiles of 1 min generated by dividing the lowest five 10-min bandwidth profiles. As shown in FIG. 23, we made the following observations.

- The stall ratio depends on both the startup buffer duration and the segment duration. With the same startup buffer duration of 8 seconds, the stall ratio with segments of 4 seconds is only 57.7% of the ratio with segments of 8 seconds.
- Compared with using 1 segment as startup buffer, using 2 or 3 segments significantly reduces the stall possibility. In all video settings, the stall ratio for using 3 segments is less than 41.7% of the stall ratio for 1 segment.
- Using a higher bitrate track as startup track can significantly increase stall possibility, especially when startup buffer is only 1 segment. With the startup buffer duration set to be 4 seconds, when increasing the startup track bitrate from 0.5 Mpbs to 1 Mbps, the stall ratio increases from 60.0% to 91.1%.

Our findings suggest that apps should set the startup buffer duration to 2 to 3 segments. We checked the implementation of ExoPlayer. The startup buffer duration is a static value in seconds which developers can configure. We suggest the player should enforce the startup buffer threshold both in terms of duration and segment count. The startup track bitrate should also be relatively low to avoid stalls. Similar suggestions can be also applied to the logic when the player recovers from stall events.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, by a processing system including a processor, a request for media content, wherein the media content is divided into segments, with each segment being available in a plurality of quality levels;
    determining, by the processing system, a first signal quality of a wireless network;
    selecting, by the processing system, a first quality level of the plurality of quality levels based on the first signal quality;
    retrieving, by the processing system, at least one of the segments of the first quality level;
    storing, by the processing system, the at least one of the segments in a buffer;
    playing, by the processing system, the at least one of the segments from the buffer, the playing performed while retrieving additional segments, storing the additional segments in the buffer, and deleting segments that have been played from the buffer;
    responsive to an occupancy of the buffer satisfying a first threshold, halting the retrieving the additional segments and replacing a first inferior segment of the segments stored in the buffer with a first replacement segment of a higher quality level than that of the first inferior segment, wherein the replacing the first inferior segment comprises:
        determining, by the processing system, a second signal quality of the wireless network experienced during retrieval of a most recent one of the additional segments,
        selecting, by the processing system, a second quality level of the plurality of quality levels based on the second signal quality,
        identifying, by the processing system, the first inferior segment based on the second quality level,
        retrieving, by the processing system, the first replacement segment of the second quality level, the first replacement segment corresponding to the first inferior segment, and
        replacing, by the processing system, the first inferior segment with the first replacement segment;
    monitoring, by the processing system, the occupancy of the buffer; and
    responsive to the occupancy of the buffer changing from satisfying the first threshold to not satisfying the first threshold, resuming the retrieving the additional segments.

2. The method of claim 1, wherein the identifying the first inferior segment comprises identifying the first inferior segment in the buffer based on the second quality level and a second threshold.

3. The method of claim 2, wherein the second threshold varies with a number of the segments of the media content remaining to be retrieved.

4. The method of claim 1, wherein the identifying the first inferior segment comprises identifying the first inferior segment in the buffer based on a second threshold and a comparison between the second quality level of the first replacement segment and the first inferior segment.

5. The method of claim 4, wherein the second threshold varies with a number of the segments of the media content remaining to be retrieved.

6. The method of claim 1, wherein the first threshold varies with a number of the segments of the media content remaining to be retrieved.

7. The method of claim 1, comprising: responsive to the occupancy of the buffer continuing to satisfy the first threshold, individually replacing additional inferior segments stored in the buffer with additional replacement segments.

8. A device, comprising:
    a processing system including a processor;
    a user interface;
    a buffer; and
    a memory that stores executable instructions that, when executed by the processing system, facilitate performance of operations, the operations comprising:
        obtaining a request for media content, wherein the media content is divided into segments, with each segment being available in a plurality of quality levels;
        storing, in the buffer, at least one of the segments of a first quality level of the plurality of quality levels;
        presenting the at least one of the segments from the buffer to a user through the user interface, the presenting performed while retrieving additional segments, storing the additional segments in the buffer and deleting segments that have been presented from the buffer;
        responsive to an occupancy of the buffer satisfying a first threshold, halting the retrieving the additional segments and replacing a first inferior segment of the segments stored in the buffer with a first replacement segment of a higher quality level than that of the first inferior segment, wherein the replacing the first inferior segment comprises:
            determining a first signal quality of a wireless network experienced during retrieval of a most recent one of the additional segments,
            selecting a second quality level of the plurality of quality levels based on the first signal quality,
            identifying the first inferior segment based on the second quality level,
            obtaining the first replacement segment of the second quality level, the first replacement segment corresponding to the first inferior segment, and
            replacing, in the buffer, the first inferior segment with the first replacement segment;
        monitoring the occupancy of the buffer; and
        responsive to the occupancy of the buffer changing from satisfying the first threshold to not satisfying the first threshold, resuming the storing the additional segments in the buffer.

9. The device of claim 8, wherein the operations further comprise responsive to the occupancy of the buffer continuing to satisfy the first threshold, individually replacing additional inferior segments stored in the buffer with additional replacement segments.

10. The device of claim 8, wherein the identifying the first inferior segment comprises identifying the first inferior segment in the buffer based on a second threshold.

11. The device of claim 10, wherein the second threshold varies with a number of the segments of the media content remaining to be retrieved.

12. The device of claim 8, wherein the first threshold varies with a number of the segments of the media content remaining to be retrieved.

13. A non-transitory, machine-readable medium, comprising executable instructions that, when executed by a processing system including a processor, facilitate performance of operations, the operations comprising:
- storing a plurality of segments of media content in a buffer;
- presenting the plurality of segments from the buffer, the presenting performed while retrieving additional segments, storing the additional segments in the buffer, and deleting the plurality of segments that have been presented from the buffer;
- responsive to an occupancy of the buffer satisfying a first threshold, pausing the retrieving the additional segments and replacing a first inferior segment of the plurality of segments stored in the buffer with a first replacement segment of a higher quality level than that of the first inferior segment, wherein the replacing the first inferior segment comprises:
  - determining a signal quality of a wireless network experienced during retrieval of a most recent one of the additional segments,
  - selecting a quality level of a plurality of quality levels based on the signal quality,
  - identifying the first inferior segment based on the quality level,
  - retrieving the first replacement segment of the quality level, the first replacement segment corresponding to the first inferior segment, and
  - replacing the first inferior segment with the first replacement segment;
- monitoring the occupancy of the buffer; and
- responsive to the occupancy of the buffer changing from satisfying the first threshold to not satisfying the first threshold, resuming the retrieving the additional segments.

14. The non-transitory, machine-readable medium of claim 13, wherein the identifying the first inferior segment comprises identifying the first inferior segment in the buffer based on the quality level and a second threshold.

15. The non-transitory, machine-readable medium of claim 14, wherein the second threshold varies with a number of the plurality of segments of the media content remaining to be retrieved.

16. The non-transitory, machine-readable medium of claim 13, wherein the identifying the first inferior segment comprises identifying the first inferior segment in the buffer based on a second threshold and a comparison between the quality level of the first replacement segment and the first inferior segment.

17. The non-transitory, machine-readable medium of claim 16, wherein the second threshold varies with a number of the plurality of segments of the media content remaining to be retrieved.

18. The non-transitory, machine-readable medium of claim 13, wherein the first threshold varies with a number of the plurality of segments of the media content remaining to be retrieved.

19. The non-transitory, machine-readable medium of claim 13, wherein the operations further comprise responsive to the occupancy of the buffer continuing to satisfy the first threshold, individually replacing additional inferior segments stored in the buffer with additional replacement segments.

20. The non-transitory, machine-readable medium of claim 13, wherein the identifying the first inferior segment comprises identifying the first inferior segment in the buffer based on the quality level of the first replacement segment being above a second threshold and a difference between the quality level of the first replacement segment and the first inferior segment being above a third threshold.

* * * * *